United States Patent
Lee et al.

(10) Patent No.: US 10,355,843 B2
(45) Date of Patent: Jul. 16, 2019

(54) CARRIER AGGREGATION METHOD PERFORMED BY TERMINAL IN WIRELESS COMMUNICATION SYSTEM AND TERMINAL USING SAME METHOD

(71) Applicant: LG Electronics Inc., Seoul (KR)

(72) Inventors: Seungmin Lee, Seoul (KR); Suckchel Yang, Seoul (KR); Daesung Hwang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 42 days.

(21) Appl. No.: 15/545,444

(22) PCT Filed: Jan. 22, 2016

(86) PCT No.: PCT/KR2016/000749
§ 371 (c)(1),
(2) Date: Jul. 21, 2017

(87) PCT Pub. No.: WO2016/117974
PCT Pub. Date: Jul. 28, 2016

(65) Prior Publication Data
US 2018/0006788 A1   Jan. 4, 2018

Related U.S. Application Data

(60) Provisional application No. 62/106,232, filed on Jan. 22, 2015, provisional application No. 62/112,736, (Continued)

(51) Int. Cl.
*H04L 12/28*  (2006.01)
*H04L 5/00*  (2006.01)
(Continued)

(52) U.S. Cl.
CPC ............ *H04L 5/0051* (2013.01); *H04L 5/001* (2013.01); *H04L 5/0091* (2013.01); *H04W 52/32* (2013.01);
(Continued)

(58) Field of Classification Search
CPC ...................................................... H04L 12/28
(Continued)

(56) References Cited

U.S. PATENT DOCUMENTS

| | | | |
|---|---|---|---|
| 9,820,159 B2 * | 11/2017 | Ghasemzadeh | ....... H04W 16/14 |
| 2013/0215811 A1 | 8/2013 | Takaoka et al. | |
| 2014/0086167 A1 | 3/2014 | Seo et al. | |

FOREIGN PATENT DOCUMENTS

| | | |
|---|---|---|
| WO | 2012008812 | 1/2012 |
| WO | 2012057579 | 5/2012 |
| WO | 2012093911 | 7/2012 |

OTHER PUBLICATIONS

Nokia Corporation et al., "Motivation for New WI Proposal: LTE Carrier Aggregation Enhancement Beyond 5 Carriers," RP-142012, 3GPP TSG RAN Meeting #66, Maui, USA, Dec. 2, 2014.
(Continued)

*Primary Examiner* — Dang T Ton
(74) *Attorney, Agent, or Firm* — Dentons US LLP

(57) ABSTRACT

The present invention provides a massive carrier aggregating method performed by a terminal in a wireless communication system, the method comprising the steps of: controlling a plurality of sounding reference signal (SRS) transmission powers with respect to a plurality of SRS cells to be triggered, respectively; and simultaneously transmitting a plurality of SRSs relating to the plurality of SRS cells to be triggered to a network, wherein the plurality of SRS transmission powers are different from each other.

3 Claims, 19 Drawing Sheets

Related U.S. Application Data filed on Feb. 6, 2015, provisional application No. 62/115,161, filed on Feb. 12, 2015.

(51) Int. Cl.
*H04W 52/32* (2009.01)
*H04L 5/14* (2006.01)

(52) U.S. Cl.
CPC ............ *H04L 5/0023* (2013.01); *H04L 5/14* (2013.01); *H04W 52/325* (2013.01)

(58) Field of Classification Search
USPC ........................................................ 370/329
See application file for complete search history.

(56) References Cited

OTHER PUBLICATIONS

3GPP TS 36.211 V8.5.0, Dec. 2008.

\* cited by examiner

CARRIER AGGREGATION METHOD PERFORMED BY TERMINAL IN WIRELESS COMMUNICATION SYSTEM AND TERMINAL USING SAME METHOD

CROSS-REFERENCE TO RELATED APPLICATIONS

This application is the National Stage filing under 35 U.S.C. 371 of International Application No. PCT/KR2016/000749, filed on Jan. 22, 2016, which claims the benefit of U.S. Provisional Applications No. 62/106,232 filed on Jan. 22, 2015, No. 62/112,736 filed on Feb. 6, 2015 and No. 62/115,161 filed on Feb. 12, 2015, the contents of which are all hereby incorporated by reference herein in their entirety.

BACKGROUND OF THE INVENTION

Field of the Invention

The present invention relates to wireless communication and, more particularly, to a carrier aggregation method performed by a terminal in a wireless communication system and a terminal using the method.

Related Art

In International Telecommunication Union Radio communication sector (ITU-R), a standardization task for International Mobile Telecommunication (IMT)-Advanced, that is, a next-generation mobile communication system since the third generation, is in progress. IMT-Advanced sets its goal to support Internet Protocol (IP)-based multimedia services at a data transfer rate of 1 Gbps in the stop and slow-speed moving state and of 100 Mbps in the fast-speed moving state.

For example, $3^{rd}$ Generation Partnership Project (3GPP) is a system standard to satisfy the requirements of IMT-Advanced and is preparing for LTE-Advanced improved from Long Term Evolution (LTE) based on Orthogonal Frequency Division Multiple Access (OFDMA)/Single Carrier-Frequency Division Multiple Access (SC-FDMA) transmission schemes. LTE-Advanced is one of strong candidates for IMT-Advanced.

An LTE-A system adopts a Carrier Aggregation (CA). In this case, the carrier aggregation means performs reception and transmission by aggregating a plurality of Component Carriers (CC). The CC may be divided into a Primary Component Carrier (PCC) and a Secondary Component Carrier (SCC). Such a PCC may be called a primary cell (PCell). Furthermore, other CCs other than one PCC may be defined as SCCs. The SCC may be called a secondary cell (SCell). A UE may perform uplink transmission through a secondary cell.

In an SRS triggering message, SRS triggering has been indicated with respect to each of cells that are the triggering targets of an SRS. In a conventional technology, the head of the SRS triggering message has not been excessively increased although SRS triggering is indicated with respect to each of cells that are SRS triggering targets as described above because since the number of cells in which a carrier aggregation is configured is small. However, at the present day in which data has suddenly increased, in order to provide a better communication environment compared to a conventional technology, a carrier aggregation has been configured with respect to a larger number of cells than that of a conventional technology. For this reason, if SRS triggering is indicated with respect to each of cells that are SRS triggering targets as in a conventional technology, it causes an excessive increase of the head. Accordingly, there is a need for a method for solving the problem.

Furthermore, when a carrier aggregation is configured with respect to a large number of cells as described above, a power coordination method for each of cells that send an SRS becomes problematic. Accordingly, there is a need for a method for solving the problem.

SUMMARY OF THE INVENTION

An object of the present invention is to provide a Carrier Aggregation (CA) method performed by a terminal in a wireless communication system and a terminal using the same.

In an aspect, a method for massive carrier aggregation in a wireless communication system is provided. The method is performed by a user equipment (UE) and comprises receiving a sounding reference signal (SRS) triggering message from a network, determining an SRS triggering target cell based on the SRS triggering message, and sending an SRS for the determined SRS triggering target cell, wherein the SRS triggering message comprises information indicative of a plurality of cells triggering an SRS in a massive carrier aggregation.

The information indicative of the target cell triggering the SRS may be information indicative of a target cell triggering an aperiodic SRS.

The information indicative of the target cell triggering the aperiodic SRS may comprise information indicative of a cell or cell group configured in the UE, and at least one SRS triggering target cell is determined based on the cell or cell group indicated by the information indicative of the target cell triggering the aperiodic SRS.

The sending the SRS may comprise sending an SRS for a cell included in a set of cells whose aperiodic SRS is triggered to the network, and wherein the set of cells at which aperiodic SRS is triggered is determined based on a cell or cell group indicated by the information indicative of the target cell triggering the aperiodic SRS.

The SRS triggering message may comprise an SRS request field of 1 bit or 2 bits.

If a cell greater than a predetermined number has been configured in the UE according to a carrier aggregation scheme, the SRS may request field is an SRS request field of 2 bits.

If a physical uplink control channel (PUCCH) having a payload size greater than a predetermined value has been set, the SRS may request field is an SRS request field of 2 bits.

In other aspects, a method for massive carrier aggregation in a wireless communication system is provided. The method is performed by a user equipment (UE) and may comprise coordinating a plurality of pieces of SRS transmission power for a plurality of sounding reference signal (SRS) triggering target cells, respectively, and sending a plurality of SRSs related to the plurality of SRS triggering target cells to a network simultaneously based on the coordinated transmission power, wherein the plurality of pieces of SRS transmission power is different.

The plurality of pieces of SRS transmission power may be scaled down at a predetermined ratio until a sum of the plurality of pieces of SRS transmission power becomes less than a predetermined value.

Scaling down the plurality of pieces of SRS transmission power at the predetermined ratio may be performed in a cell unit or SRS antenna port unit.

The plurality of SRS triggering target cells may be cells whose SRS transmission has been previously configured to be performed.

The plurality of SRS triggering target cells may be cells based on a licensed spectrum or cells whose physical uplink control channel (PUCCH) transmission has been configured.

In other aspects, a method for massive carrier aggregation in a wireless communication system is provided. The method is performed by a user equipment (UE) and comprises determining a transmission of a sounding reference signal (SRS) related to an (N-K) cell of N cells configured in the UE by a massive carrier aggregation based on transmission power, and sending at least one SRS related to the (N-K) cell to a network based on the determination, wherein the N is a natural number having a value of 2 or more and the K is a natural number having a value smaller than the N.

The cell configured in the UE by the massive carrier aggregation may comprise at least one cell based on a licensed spectrum and at least one cell based on an unlicensed spectrum, and the step of determining the transmission of the SRS related to the (N-K) cell comprises steps of: determining the at least one cell based on the unlicensed spectrum to be a K cell if a sum of transmission power of the SRS related to the N cells is greater than a predetermined value and a sum of transmission power of the SRS for the at least one cell based on the licensed spectrum does not exceed the predetermined value, and determining, by the UE, to drop SRS transmission related to the K cell.

The at least one cell based on the licensed spectrum is determined to be the (N-K) cell, and the method further comprises a step of increasing transmission power of an SRS related to the (N-K) cell at a predetermined ratio within a range in which the predetermined value is not exceeded in order to reallocate extra transmission power generated because the SRS transmission related to the K cell is dropped as SRS transmission power related to the (N-K) cell.

The cell configured in the UE by the massive carrier aggregation comprises at least one cell based on a licensed spectrum and at least one cell based on an unlicensed spectrum, the step of determining the transmission of the SRS related to the (N-K) cell comprises: determining the at least one cell based on the unlicensed spectrum to be a K cell if a sum of transmission power of the SRS related to the N cells is greater than a predetermined value and a sum of transmission power of the SRS for the at least one cell based on the licensed spectrum does not exceed the predetermined value; and scaling down transmission power of an SRS related to the K cell at a predetermined ratio until a sum of the transmission power of the SRS related to the N cell does not exceed the predetermined value, and in the step of sending the at least one SRS to the network, the SRS related to the K cell is further transmitted based on the scaled-down transmission power.

In accordance with the present invention, there are provided a Carrier Aggregation (CA) method performed by a terminal in a wireless communication system and a terminal using the same.

In accordance with the present invention, a UE can send and receive a large amount of data because it can configure a carrier aggregation with respect to a large number of cells.

In accordance with the present invention, if a carrier aggregation for a large number of cells has been configured in a UE, efficient SRS transmission can be performed because SRS transmission for the large number of cells can be simultaneously performed. Furthermore, when a UE simultaneously performs SRS transmission for a plurality of cells, it can perform efficient SRS transmission because it sets pieces of SRS transmission power for the plurality of cells as different values.

DESCRIPTION OF EXEMPLARY EMBODIMENTS

Figure 1:
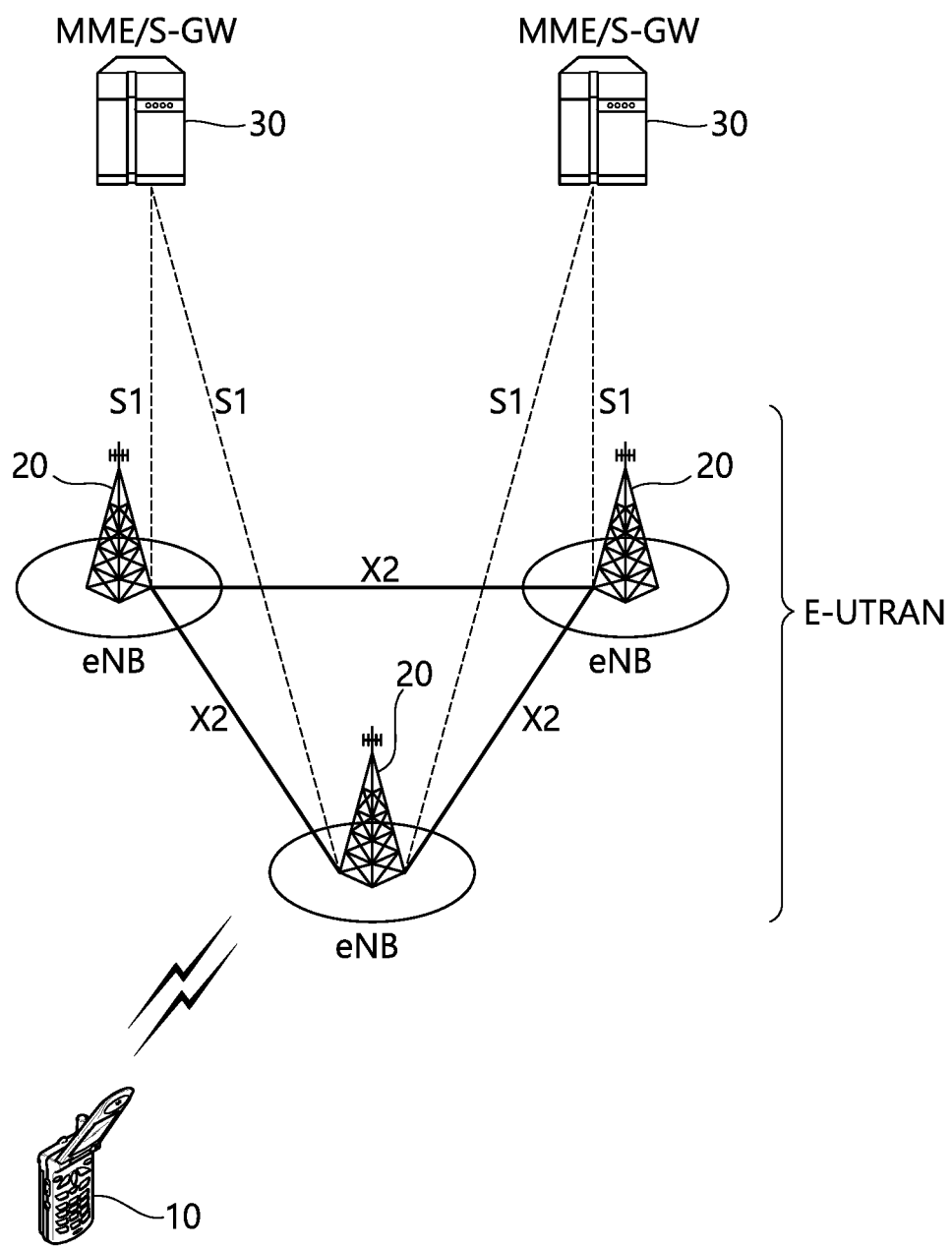
FIG. 1 shows a wireless communication system to which the present invention is applied.

FIG. 1 shows a wireless communication system to which the present invention is applied. The wireless communication system may also be called an Evolved-UMTS Terrestrial Radio Access Network (E-UTRAN) or a Long Term Evolution (LTE)/LTE-A system.

The E-UTRAN includes a Base Station (BS) 20 which provides a User Equipment (UE) 10 with a control plane and a user plane. The UE 10 may be fixed or may have mobility, and may be called another term, such as a Mobile Station (MS), a User Terminal (UT), a Subscriber Station (SS), a Mobile Terminal (MT) or a wireless device. The BS 20 refers to a fixed station that communicates with the UE 10 and may be called another term, such as an evolved-NodeB (eNB), a Base Transceiver System (BTS) or an access point.

The BSs 20 may be interconnected through an X2 interface. The BS 20 is connected to an Evolved Packet Core (EPC) 30 through an S1 interface, more specifically, to a Mobility Management Entity (MME) through an S1-MME and a Serving Gateway (S-GW) through an S1-U.

The EPC 30 includes the MME, the S-GW and a Packet Data Network-Gateway (P-GW). The MME has access information about a UE or information regarding the capabilities of the UE. Such information is chiefly used in the mobility management of a UE. The S-GW is a gateway having the E-UTRAN as an end point. The P-GW is a gateway having a PDN as an end point.

The layers of a radio interface protocol between the UE and a network may be divided into an L1 (first layer), L2 (second layer) and L3 (third layer) on the basis of lower 3 layers of an Open System Interconnection (OSI) reference model which has been widely known in communication systems. From among the three layers, a physical layer belonging to the first layer provides information transfer service using a physical channel. A Radio Resource Control (RRC) layer located in the third layer functions to control wireless resources between the UE and a network. To this end, the RRC layer exchanges RRC messages between the UE and the BS.

Figure 2:
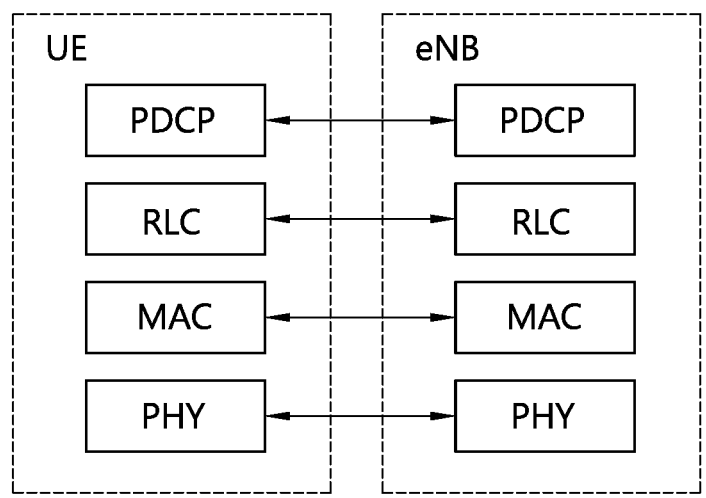
FIG. 2 is a block diagram showing radio protocol architecture for the user plane.
Figure 3:
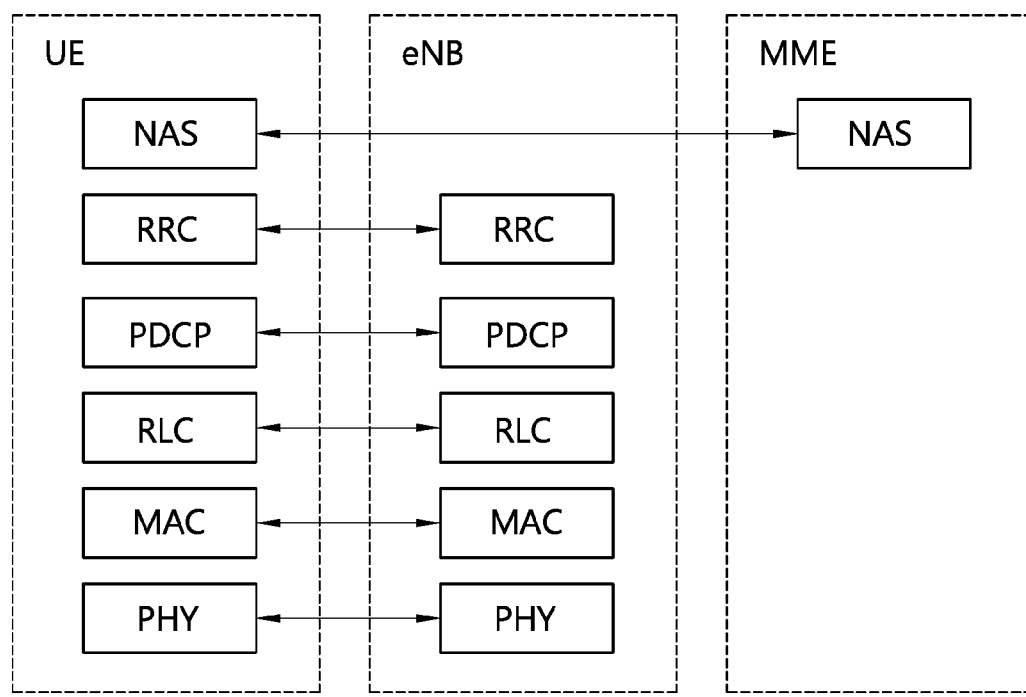
FIG. 3 is a block diagram showing radio protocol architecture for the control plane.

FIG. 2 is a block diagram showing radio protocol architecture for the user plane. FIG. 3 is a block diagram showing radio protocol architecture for the control plane. The user plane is a protocol stack for user data transmission, and the control plane is a protocol stack for control signal transmission.

Referring to FIGS. 2 and 3, the physical layer (PHY) provides information transfer service to a higher layer using a physical channel. The PHY layer is connected to a Medium Access Control (MAC) layer, that is, a higher layer, through a transport channel. Data is moved between the MAC layer and the PHY layer through the transport channel. The transport channel is classified depending on how data is transmitted through a wireless interface according to which characteristic.

Data is moved between different PHY layers, that is, the PHY layers of a transmitter and receiver through a physical channel. The physical channel may be modulated according to an Orthogonal Frequency Division Multiplexing (OFDM) method, and uses the time and frequency as wireless resources.

The function of the MAC layer includes mapping between a logical channel and a transport channel and multiplexing/demultiplexing to a transport block provided to a physical channel on the transport channel of an MAC Service Data Unit (SDU) that belongs to a logical channel. The MAC layer provides a service to a Radio Link Control (RLC) layer through a logical channel.

The function of the RLC layer includes the concatenation, segmentation and reassembly of an RLC SDU. In order to guarantee various types of Quality of Services (QoS) required by a Radio Bearer (RB), the RLC layer provides three operation modes of a Transparent Mode (TM), Unacknowledged Mode (UM) and Acknowledged Mode (AM). The AM RLC provides error correction through an automatic repeat request (ARQ).

A Radio Resource Control (RRC) layer is defined only in the control plane. The RRC layer is related to the configuration, re-configuration and release of radio bearers and is responsible for control of logical channels, transport channels and physical channels. An RB means a logical path provided by the first layer (PHY layer) and the second layer (the MAC layer, the RLC layer or the PDCP layer) for data transfer between the UE and the network.

The function of a Packet Data Convergence Protocol (PDCP) layer in the user plane includes the transfer, header compression and ciphering of user data. The function of the PDCP in the control plane includes the transfer and integrity protection of control plane data.

To configure an RB means a process of defining the characteristics of a wireless protocol layer and channel in order to provide a specific service and of configuring each detailed parameter and operation method. An RB may be divided into two types: a Signaling RB (SRB) and a Data RB (DRB). The SRB is used as a passage along which an RRC message is transmitted in the control plane, and the DRB is used as a passage along which user data is transmitted in the user plane.

When RRC connection is established between the RRC layer of the UE and the RRC layer of the E-UTRAN, the UE is in the RRC connected state. If not, the UE is in the RRC idle state.

A downlink transport channel through which data is transmitted from the network to the UE includes a broadcast channel (BCH) through which system information is transmitted and a downlink shared channel (SCH) through which user traffic or a control message is transmitted. In the case of the traffic or control message of a downlink multicast or broadcast service, it may be transmitted through a downlink SCH or may be transmitted through a separate downlink multicast channel (MCH). Meanwhile, an uplink transmission channel through which data is transmitted from the UE to the network includes a Random Access Channel (RCH) through which an initial control message is transmitted and an uplink shared channel (SCH) through user traffic or control messages are transmitted.

The logical channel located over the transport channel and mapped to the transport channel includes a Broadcast Control Channel (BCCH), a Paging Control Channel (PCCH), a Common Control Channel (CCH), a Multicast Control Channel (MCCH), a Multicast Traffic Channel (MTCH), and so on.

The physical channel includes some OFDM symbols in a time domain and some subcarriers in a frequency domain. One subframe includes a plurality of OFDM symbols in the time domain. A resource block is a resource allocation unit and includes a plurality of OFDM symbols and a plurality of subcarriers. Furthermore, each subframe may use specific subcarriers of specific OFDM symbols (e.g., the first OFDM symbol) of the corresponding subframe for a Physical Downlink Control Channel (PDCCH), that is, an L1/L2 control channel A Transmission Time Interval (TTI) is a unit time for subframe transmission.

Figure 4:
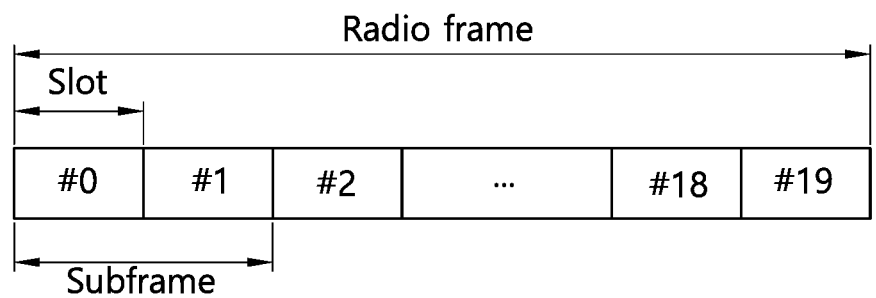
FIG. 4 shows a radio frame structure of 3GPP LTE.

FIG. 4 shows a radio frame structure of 3GPP LTE.

Referring to FIG. 4, a radio frame consists of 10 subframes. One subframe consists of 2 slots. One subframe may have a length of 1 millisecond (ms), and one slot may have a length of 0.5 ms. A time for transmitting one subframe is defined as a transmission time interval (TTI). The TTI may be a minimum unit of scheduling. The structure of the wireless frame is merely exemplary, and the number of subframes included in the wireless frame and the number of slots included in the subframe may be variously changed.

Figure 5:
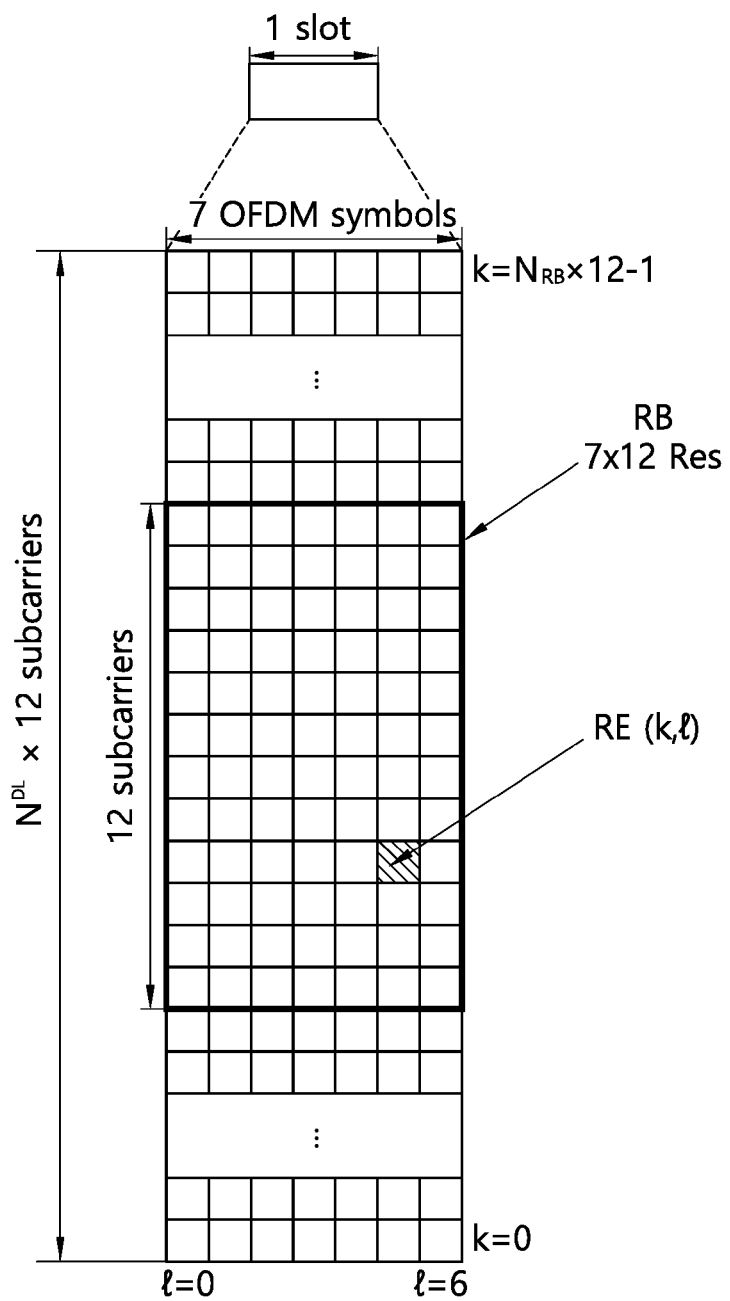
FIG. 5 is an exemplary diagram showing a resource grid for one downlink slot.

FIG. 5 is an exemplary diagram showing a resource grid for one downlink slot.

One slot may include a plurality of orthogonal frequency division multiplexing (OFDM) symbols in a time domain. Since the 3GPP LTE uses OFDMA in DL transmission, the OFDM symbol is for representing one symbol period, and may be referred to as other terms. For example, the OFDM symbol may also be referred to as an SC-FDMA symbol when SC-FDMA is used as a UL multiple-access scheme. Although it is described herein that one slot includes 7

OFDM symbols, the number of OFDM symbols included in one slot may change depending on a cyclic prefix (CP) length. According to 3GPP TS 36.211 V8.5.0 (2008 December), one subframe includes 7 OFDM symbols in case of a normal CP, and includes 6 OFDM symbols in case of an extended CP.

Furthermore, a slot includes a plurality of resource blocks (RB) in a time domain. A resource block includes a plurality of consecutive subcarriers in one slot in resource allocation units. In the resource block, a subcarrier may have an interval of 15 KHz.

Each component on the resource grid is referred to as a resource element (RE), and one resource block includes 12×7 resource elements. NDL, which is the number of resource blocks included in the downlink slot, is dependent on the downlink transmission bandwidth which is set in the cell. The resource grid which is described in FIG. 2 may also be applied in the uplink.

Figure 6:
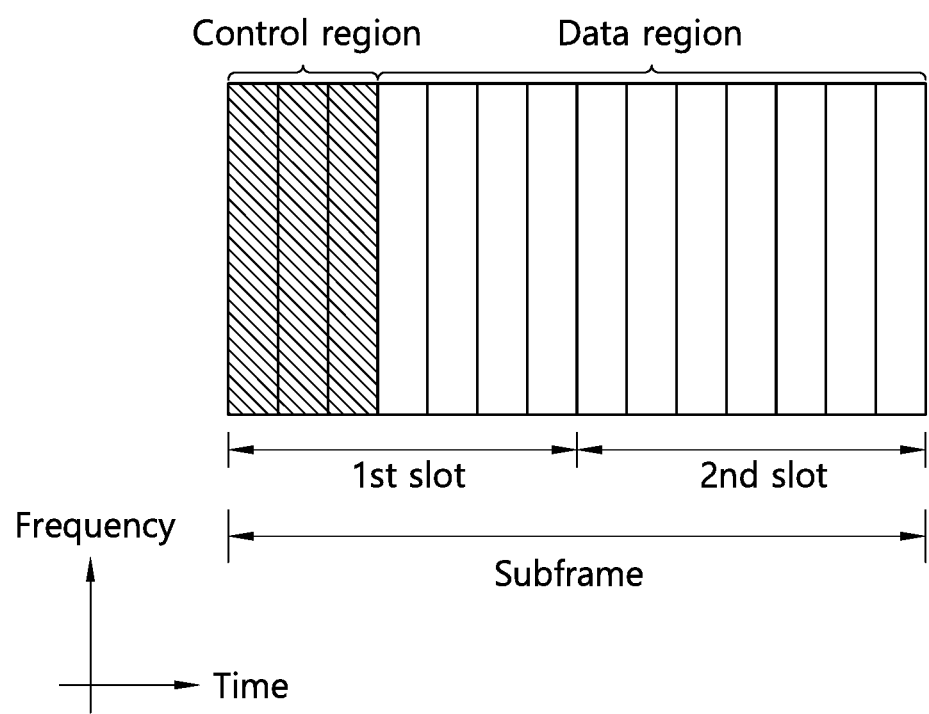
FIG. 6 shows the structure of a downlink subframe.

FIG. 6 shows the structure of a downlink subframe.

Referring to FIG. 6, a subframe includes two consecutive slots. In the subframe, up to three preceding OFDM symbols of a 1st slot correspond to a control region to which a physical downlink control channel (PDCCH) is allocated, and the remaining OFDM symbols correspond to a data region to which a physical downlink shared channel (PDSCH) is allocated. The control region may be composed of up to 4 OFDM symbols depending on the system band.

Some examples of the control channel are a physical control format indicator channel (PCFICH) and a physical hybrid-ARQ indicator channel (PHICH). PCFICH is a control channel via which information indicating the size of the control region, i.e., the number of OFDM symbols constituting the control region, is transmitted. PHICH is a control channel via which acknowledgement/not-acknowledgement (ACK/NACK) for uplink data transmission of the terminal is carried. PDCCH may carry resource allocation (also referred to as "downlink grant") and transfer format of downlink-shared channel (DL-SCH), resource allocation information (also referred to as "uplink grant") of uplink shared channel (UL-SCH), paging information on paging channel (PCH), system information on DL-SCH, resource allocation of an upper layer controller message such as a random access response transmitted via PDSCH, a set of transmission power control (TPC) commands for individual user equipments (UE) within a random UE group, activation of voice over Internet protocol (VoIP), etc. Control information transmitted through the PDCCH may be referred to as downlink control information (DCI).

Some examples of the DCI format are format 0 for PUSCH scheduling, format 1 for scheduling of one PDSCH codeword, format 1A for compact scheduling of one PDSCH codeword, format 1B for compact scheduling for rank-1 transmission of single codeword in spatial multiplexing mode, format 1C for very compact scheduling of downlink shared channel (DL-SCH), format ID for PDSCH scheduling gin multi-user spatial multiplexing mode, format 2 for PDSCH scheduling in closed-loop spatial multiplexing mode, format 2A for PDSCH scheduling in open-loop spatial multiplexing mode, format 3 for transmission of transmission power control (TPC) command of 2-bit power regulation for PUCCH and PUSCH, and format 3A for transmission of TPC command of 1-bit power regulation for PUCCH and PUSCH.

Figure 7:
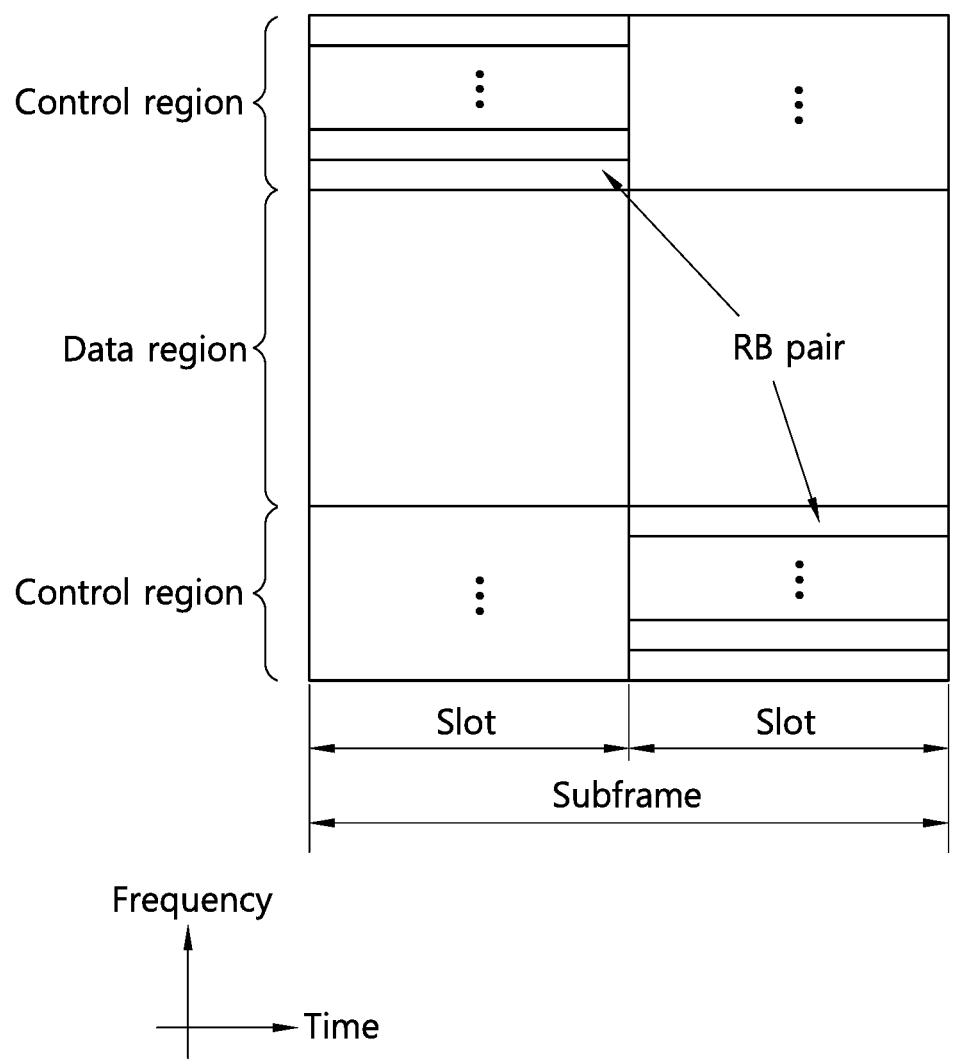
FIG. 7 shows the structure of an uplink subframe.

FIG. 7 shows the structure of an uplink subframe.

Referring to FIG. 7, the uplink subframe may be divided into a control region to which physical uplink control channel (PUCCH) for carrying uplink control information in the frequency domain is allocated, and a data region to which physical uplink shared channel (PUSCH) for carrying user data is allocated.

The PUCCH for one terminal is allocated to a pair of resource blocks (RB) in the subframe, and the RBs which belong to the RB pair occupy sub-carriers which are different for two respective slots. That is, the RB pair allocated the PUCCH is frequency-hopped in the slot boundary.

Hereinafter, the sounding reference signal (SRS) will be described.

The SRS refers to a reference signal which is used for measuring the channel quality in uplink. The SRS performs a function of measuring the channel quality for the uplink and selectively scheduling the frequency by the base station. That is, the SRS is a reference signal which is not related with the uplink data transmission or control information transmission of the terminal.

However, the SRS may also be used for other purposes such as initial modulation and coding scheme (MCS) selection for the terminal which has not been recently scheduled, and initial power control.

(1) Subframe Setting for Transmission of SRS, and Position to which SRS is Transmitted Subframe, through which SRS is transmitted by an arbitrary terminal within the cell, is indicated by cell-specific broadcast signaling. For example, "srsSubframeConfiguration" parameter which is a 4-bit cell-specific signal indicates 15 subframe sets through which SRS may be transmitted within each wireless frame. Such flexible setting possibility provides flexibility in regulating SRS overhead according to the arrangement scenario.

Furthermore, the SRS is transmitted always in the last SC-FDMA symbol of the subframes which have been set. The PUSCH is not transmitted in the SC-FDMA symbol which has been designated as transmission of SRS.

Figure 8:
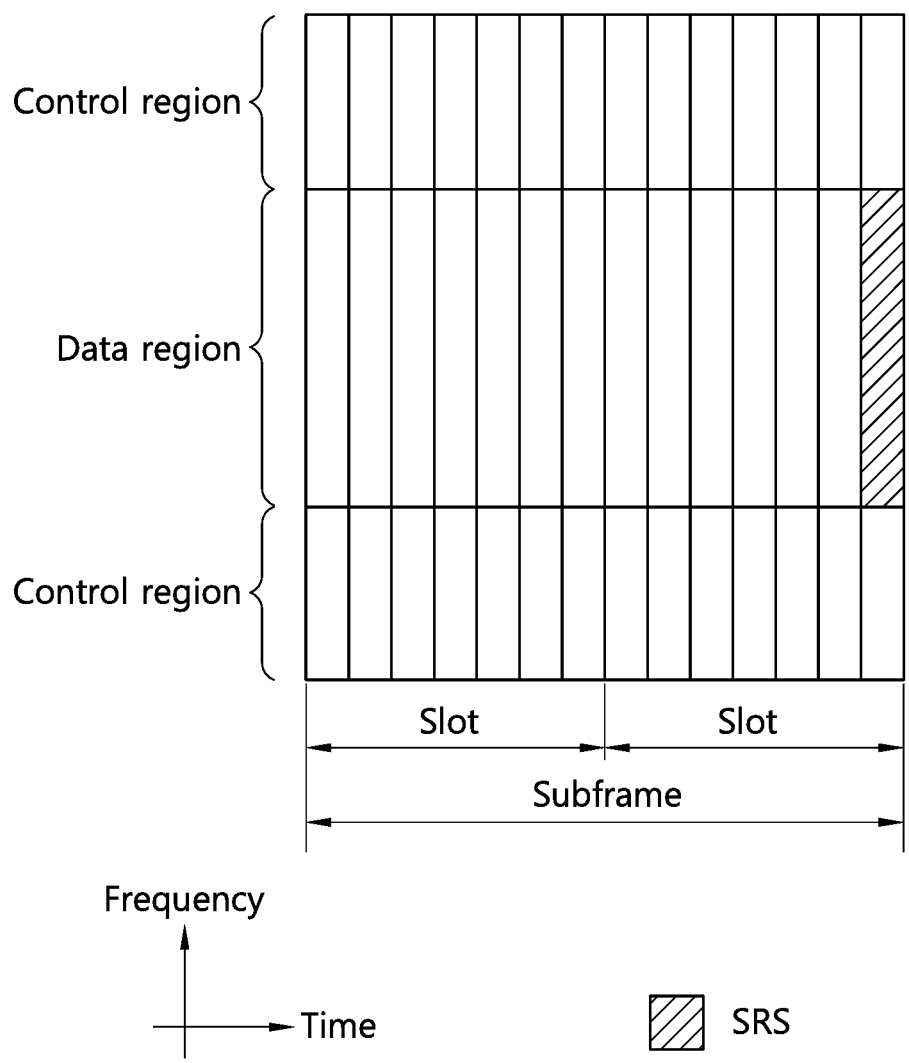
FIG. 8 shows an example of a subframe in which a sounding reference signal is transmitted.

FIG. 8 shows an example of a subframe in which a sounding reference signal is transmitted.

Referring to FIG. 8, the sounding reference signal is transmitted through 1 SC-FDMA symbol within the subframe. The SC-FDMA symbol of the section where the sounding reference signal is transmitted is referred to as a sounding symbol. Here, the last SC-FDMA symbol is the sounding symbol among 14 SC-FDMA symbols that constitute the subframe, but this is merely an example, and the location or number of sounding symbols within the subframe may be variously changed.

The sounding reference signal is not transmitted in the control region, but is transmitted in the data region. The terminal may transmit the sounding reference signal through all frequencies (or subcarriers) of the data region or through some frequencies of the data region. When the terminal transmits the sounding reference signal through some frequencies, each subframe, through which the sounding reference signal is transmitted, may be hopped to a different frequency to be transmitted. Furthermore, the terminal may transmit the sounding reference signal by using only the subcarrier of the even or odd number index.

(2) Duration and Cycle of SRS Transmission

The base station may 1) request individual SRS transmission to the terminal or 2) set the terminal to periodically transmit SRS until the transmission is stopped. To this end, a 1-bit UE-specific parameter, i.e., "duration", is used, and this parameter indicates whether the requested SRS transmission is a one-time transmission or periodic. If the periodic SRS transmission is set to the terminal, the cycle may be one of 2, 5, 10, 20, 40, 80, 160, or 320 ms.

The cycle within which the terminal needs to transmit SRS, and the subframe offset value within the cycle are indicated by the UE-specific parameter (referred to as "srsConfigurationIndex").

(3) SRS band

In LTE, up to 4 SRS bands are simultaneously supported to support many SRSs. 8 sets are defined for each of the 4 SRS bands in order to provide flexible setting for the SRS band value. The base station provides a 3 bit-cell-specific parameter called "srsBandwidthConfiguration" through RRS signaling, and one of the 8 sets is indicted through this parameter.

Table 1 below shows 8 sets for each of 4 SRS bands when the uplink system band has a range between 80 to 110 resource blocks.

TABLE 1

| SRS bandwidth configuration | SRS-Bandwidth $B_{SRS} = 0$ | | SRS-Bandwidth $B_{SRS} = 1$ | | SRS-Bandwidth $B_{SRS} = 2$ | | SRS-Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

Which of the 4 SRS bands would be used may be set by a 2-bit UE-specific parameter (referred to as "srsBandwidth"). As shown in Table 1 above, the smallest supported SRS band is a 4-resource block. Such a small SRS band is used when a power-limited terminal provides higher-quality channel information.

Furthermore, the SRS band is set to mutually have a multiple relation. This is for providing frequency hopping between different SRS bands. The frequency hopping is set to be possible or impossible according to the value of the parameter called "frequencyDomainPosition" which is provided to each terminal.

Table 2 below shows a summary of SRS parameters which are signaled to the terminal.

TABLE 2

| SRS parameter | meaning | Signal transmission type |
|---|---|---|
| srsBanwidthConfiguration | Maximum SRS band within cell | Cell-specific |
| srsSubframeConfiguration | Set of subframes through which SRS may be transmitted within cell | Cell-specific |
| srsBandwidth | SRS transmission band of terminal | UE-specific |
| frequencyDomainPosition | Position of frequency domain | UE-specific |
| srsHoppingBandwidth | Size of frequency hop | UE-specific |
| Duration | Indicating single SRS or periodic recognition | UE-specific |
| srsConfigurationIndex | Cycle and subframe offset | UE-specific |
| transmissionComb | Transmission comb offset | UE-specific |
| nCSSRS | Cyclic shift | UE-specific |

In Table 2 above, "srsBandwidthConfiguration" indicates the maximum band where the SRS may be transmitted within the cell.

"srsSubframeConfiguration" indicates a possible set of subframes through which SRS may be transmitted within each wireless frame. "srsSubframeConfiguration" is a signal which is broadcast in a cell-specific manner, and is transmitted to the terminal within the cell. The signal may be composed of 4 bits. The SRS may be transmitted in the last SC-FDMA symbol within the subframes through which the SRS may be transmitted. The uplink data transmission of the terminal may not be allowed in the SC-FDMA symbol where the SRS is transmitted.

"srsBandwidth" indicates the SRS transmission band of the terminal. The SRS transmission band may be determined according to the number of terminals which may be supported by the base station, etc. "duration" is a parameter that indicates whether the base station requests one-time SRS transmission to the terminal or sets the terminal to periodically transmit SRS. The terminal may transmit SRS only once by this parameter or may be periodically transmitted to the base station.

"transmissionComb" indicates the subcarrier to which the SRS transmitted by the terminal is allocated. In a multi-user environment, it is necessary to overlap SRSs which are transmitted from different terminals and have different SRS bands. To this end, 2 person interleaved FDMA (IFDMA) is used as a repetition factor (RPF) in the SC-FDMA symbol where SRS is transmitted. For example, in the SRS transmission band, it may be indicated whether the SRS is transmitted in (odd number)th subcarrier or the SRS is transmitted in (even number)th subcarrier. In the time domain, the RRF is operated as the decimation factor. In SC-FDMA symbol where the SRS is transmitted, the subcarrier, through which the SRS is transmitted, comes to have a comb-like spectrum like a comb. That is, the subcarrier, through which the SRS is transmitted, is composed of only (even number)th subcarriers in the allocated sounding band. The terminal is allocated a parameter called "transmissionComb" due to the IFDMA structure of the symbol where the SRS is transmitted. "transmissionComb" has a value of 0 or 1, and notifies from where the SRS is transmitted.

Furthermore, the SRS may be aperiodically transmitted by the request of the base station. If the base station dynamically gives a triggering signal through PDCCH, such an aperiodic SRS transmission indicates that the terminal transmits the SRS.

Figure 9:
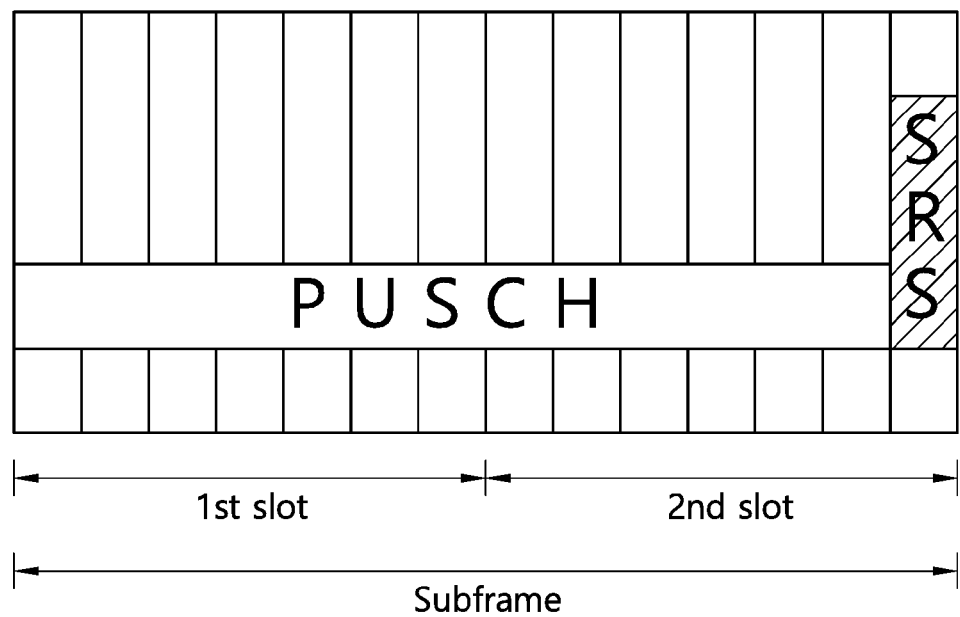
FIG. 9 is an example of the configuration of an aperiodic SRS and a PUSCH in an SRS subframe.

FIG. 9 is an example of the configuration of an aperiodic SRS and a PUSCH in an SRS subframe.

The SRS subframe of FIG. 9 is any one of aperiodic UE-specific SRS subframes determined in a UE-specific way. Alternatively, if an aperiodic UE-specific SRS subframe is the same as an SRS subframe determined in a cell-specific way, the SRS subframe of FIG. 9 is any one of SRS subframes determined in a cell-specific way.

The last SC-FDMA symbol of the SRS subframe is allocated for aperiodic SRS transmission. A PUSCH is allocated to the remaining SC-FDMA symbols and data may be transmitted. That is, uplink data through the aperiodic SRS and PUSCH in the SRS subframe is simultaneously transmitted. In this case, the PUSCH may be subjected to rate matching other than the last SC-FDMA symbol allocated to the aperiodic SRS. PUSCH transmission in a corresponding SRS subframe may be subjected to rate matching so that PUSCH transmission is performed in the remaining SC-FDMA symbols in which an aperiodic SRS is not transmitted without a limit to the relation between the transmission bandwidth of the aperiodic SRS and a bandwidth occupied by the PUSCH. That is, rate matching is always performed on a PUSCH in order to obviate ambiguity regardless of whether the aperiodic SRS is transmitted in a UE-specific SRS subframe. If rate matching is performed on the PUSCH, the reliability and coverage of the aperiodic SRS transmission can be improved while reducing a data rate corresponding to one SC-FDMA symbol when data is transmitted through the PUSCH. Furthermore, from a viewpoint of aperiodic SRS transmission, a single carrier characteristic can be maintained in the last SC-FDMA symbol of the SRS subframe.

A bandwidth occupied by the aperiodic SRS in the last SC-FDMA symbol of the SRS subframe may be a full system bandwidth or may be a narrow band or partial bandwidth. Furthermore, the bandwidth occupied by the aperiodic SRS may be a UE-specific SRS bandwidth defined in LTE rel-8/9 and may be an SRS bandwidth newly defined in LTE-A. In the remaining SC-FDMA symbols, there is no limit to a bandwidth occupied by the PUSCH.

Figure 10:
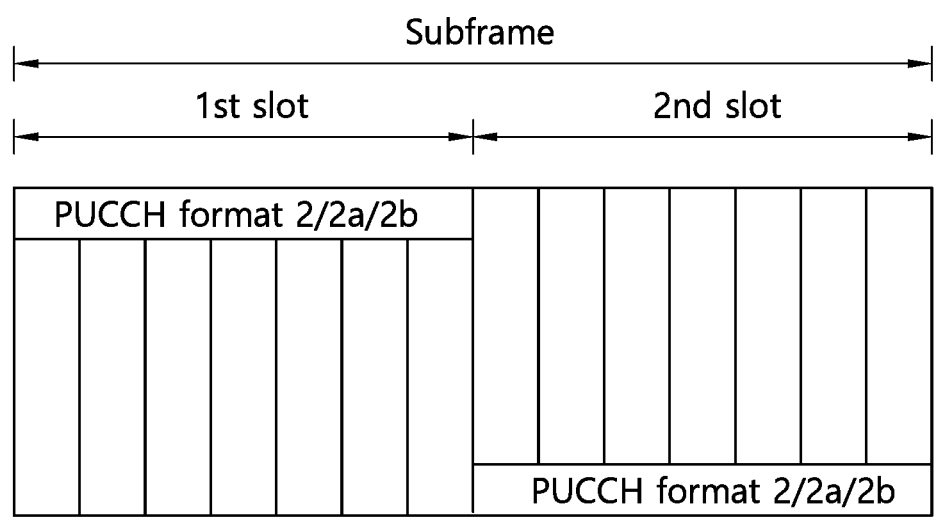
FIG. 10 is an example of the configuration of an aperiodic SRS and a PUCCH in an SRS subframe.

FIG. 10 is an example of the configuration of an aperiodic SRS and a PUCCH in an SRS subframe.

The PUCCH of FIG. 10 may be the PUCCH format 2 that carries a CQI according to various modulation schemes. Alternatively, the PUCCH of FIG. 10 may be the PUCCH format 2a or 2b that carries a CQI and ACK/NACK at the same time. Furthermore, the SRS subframe of FIG. 10 is any one of SRS subframes determined in a UE-specific way. Alternatively, the SRS subframe of FIG. 10 is any one of SRS subframes determined in a cell-specific way. Referring to FIG. 10, if the PUCCH is allocated to the SRS subframe, the transmission of the aperiodic SRS may be dropped and only UL control information may be transmitted through the PUCCH. Accordingly, a single carrier characteristic can be maintained.

In 3GPP LTE-A, a PUSCH and a PUCCH may be configured in a subframe at the same time. This may be indicated by higher layer signaling. Accordingly, a PUSCH and a PUCCH may be simultaneously allocated to a UE-specific SRS subframe in which an aperiodic SRS may be transmitted. If a PUSCH has been allocated to a UE-specific SRS subframe as described above and if a PUCCH has been allocated to a UE-specific SRS subframe as described above, an operation related to the aperiodic SRS transmission of a UE has been defined. However, if a PUSCH and a PUCCH are simultaneously allocated to a UE-specific SRS subframe, an operation related to the aperiodic SRS transmission of a UE has not been defined. That is, if a UE-specific SRS subframe and a subframe in which a PUSCH and a PUCCH are simultaneously allocated overlap, it is necessary to define the operation of a UE related to the transmission of an aperiodic SRS.

1) First, the transmission of an aperiodic SRS may be dropped according to the allocation of a PUCCH, and a PUSCH may be subjected to rate matching other than the last SC-FDMA symbol of an SRS subframe. That is, this corresponds to a case where the case where a PUSCH has been allocated to an SRS subframe in FIG. 11 and the case where a PUCCH has been allocated to an SRS subframe in FIG. 10 have been combined. Aperiodic SRS transmission in the last SC-FDMA symbol is dropped according to a single carrier characteristic, and UL control information is transmitted through the PUCCH. Furthermore, rate matching is always performed on the PUSCH because the corresponding subframe is a UE-specific SRS subframe. Since the PUCCH is allocated, rate matching is performed on the PUSCH although the aperiodic SRS is not actually transmitted. Accordingly, some degree of radio resources may be lost.

2) Alternatively, if a PUSCH and a PUCCH are simultaneously allocated to a UE-specific SRS subframe, the transmission of an aperiodic SRS is dropped, and the PUSCH may not be subjected to rate matching. That is, the aperiodic SRS is not transmitted, the PUCCH and the PUSCH may be allocated over all of the SC-FDMA symbols of the SRS subframe. A loss of radio resources attributable to PUSCH rate matching can be minimized because rate matching is configured to be not performed on a PUSCH in a UE-specific SRS subframe in which the aperiodic SRS may be. In this case, ambiguity attributable to the rate matching of the PUSCH between a UE and a BS may not become a problem.

Figure 11:
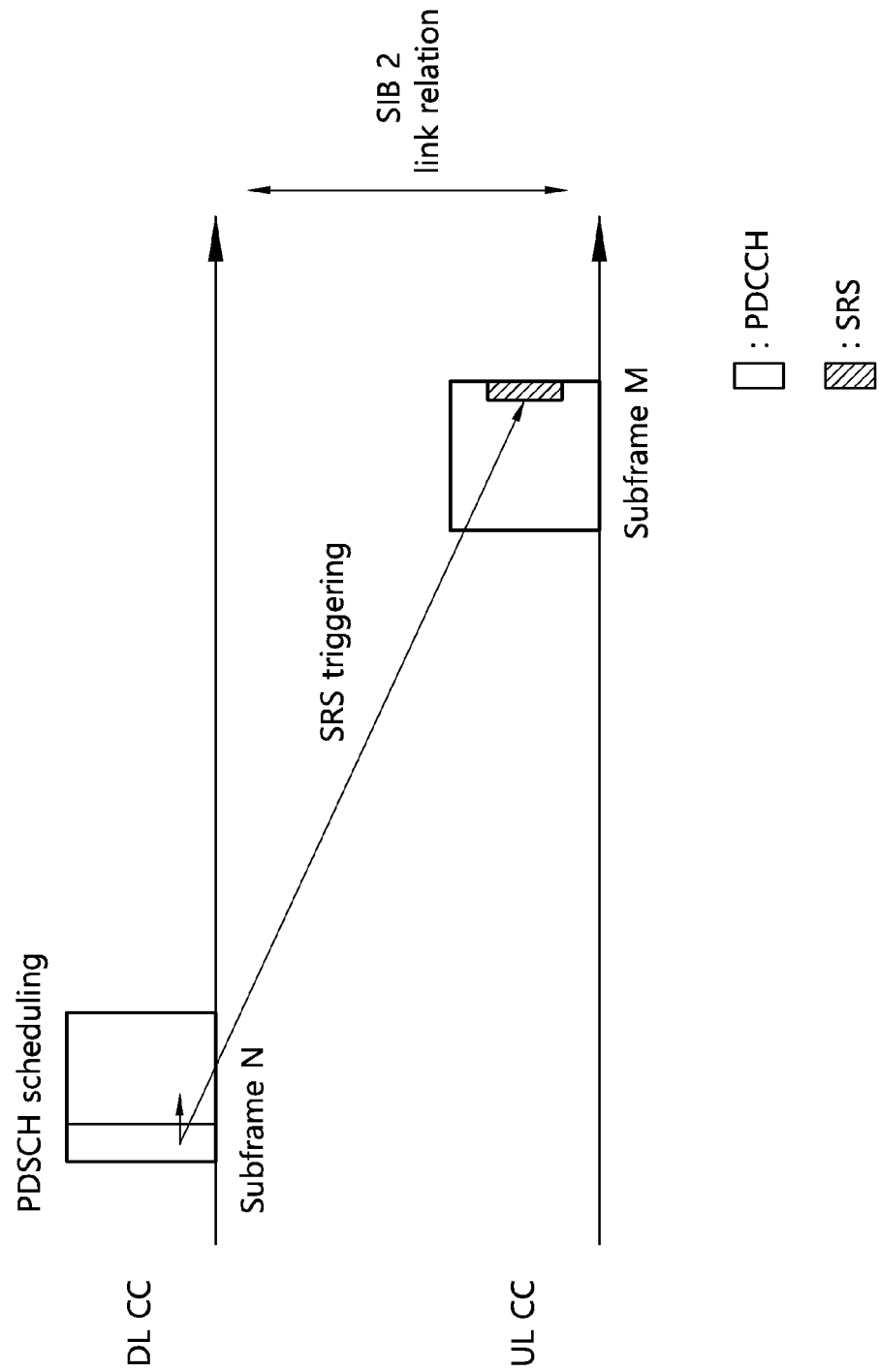
FIG. 11 shows the SRS transmission of a UE if an SRS triggering signal is transmitted through a PDCCH including a DL grant.

FIG. 11 shows the SRS transmission of a UE if an SRS triggering signal is transmitted through a PDCCH including a DL grant.

Referring to FIG. 11, the DCI format 1A may be transmitted through the PDCCH of subframe N. The DCI format 1A is used in a compact scheduling or random access process of one PDSCH codeword, and the following information is transmitted to the DCI format 1A. 1) Flag for distinguishing DCI format 0 from DCI format 1A, 2) localization/distribution virtual RB (VRB) designation flag, 3) resource block designation, 4) modulation and coding scheme, 5) HARQ process number, 6) new data indicator, 7) redundancy version, 8) transmission power control (TPC) command for PUCCH, 9) downlink designation index (only in TDD), 10) SRS request (0 or 1 bit), etc. That is, the SRS request may be included in the DCI format that schedules the PDSCH. Then the terminal may transmit SRS in subframe M. Subframe M is an example of the subframes for transmitting SRS.

Figure 12:
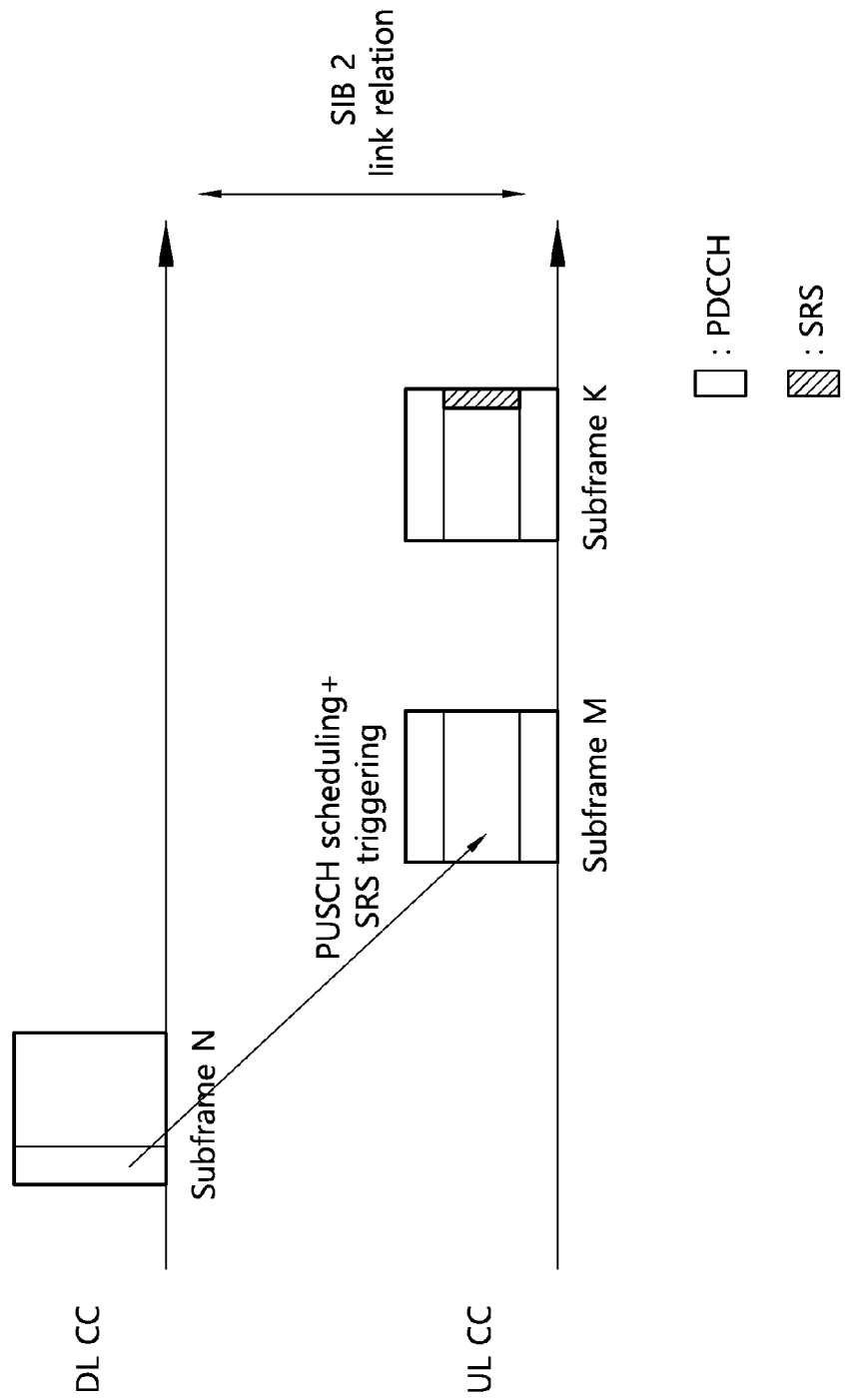
FIG. 12 shows the SRS transmission of a UE if an SRS triggering signal is transmitted through a PDCCH including an UL grant.

FIG. 12 shows the SRS transmission of a UE if an SRS triggering signal is transmitted through a PDCCH including an UL grant.

Referring to FIG. 12, DCI format 0 may be transmitted through PDCCH of subframe N. DCI format 0 is used for PUSCH scheduling, and the information (field) transmitted through DCI format 0 is as follows. 1) flag for distinguishing DCI format 0 from DCI format 1A (indicating DCI format 0 if 0, and indicating DCI format 1A if 1), 2) hopping flag (1 bit), 3) resource block designation and hopping resource allocation, 4) modulation and coding scheme and redundancy version (5 bits), 5) new data indicator (1 bit), 6) TPC command (2 bits) for scheduled PUSCH, 7) circular shift for DM-RS (3 bits), 8) UL index, 9) downlink designation index (only for TDD), 10) CQI request, 11) SRS request (0 or 1 bit), etc. That is, 1 bit SRS request may be included in DCI format that schedules PUSCH. That is, the terminal may transmit SRS in subframe K. Subframe K is an example of a subframe through which SRS may be transmitted.

Hereinafter, a carrier aggregation system is described.

An LTE-A system adopts a Carrier Aggregation (CA). In this case, the CA means performing reception and transmission by aggregating a plurality of Component Carriers (CCs). An LTE system improves the transmission bandwidth of a UE and increase use efficiency of a frequency through a CA.

The CC may be divided into a Primary Component Carrier (PCC) and a Secondary Component Carrier (SCC). The PCC is a CC, that is, the center of the management of CCs when several CCs are used, and is defined for each UE. Such a PCC may be called a primary cell (PCell).

Furthermore, other CCs other than one PCC may be defined as SCCs. The SCC may be called a secondary cell (SCell). A UE may perform uplink transmission through an SCell.

Figure 13:
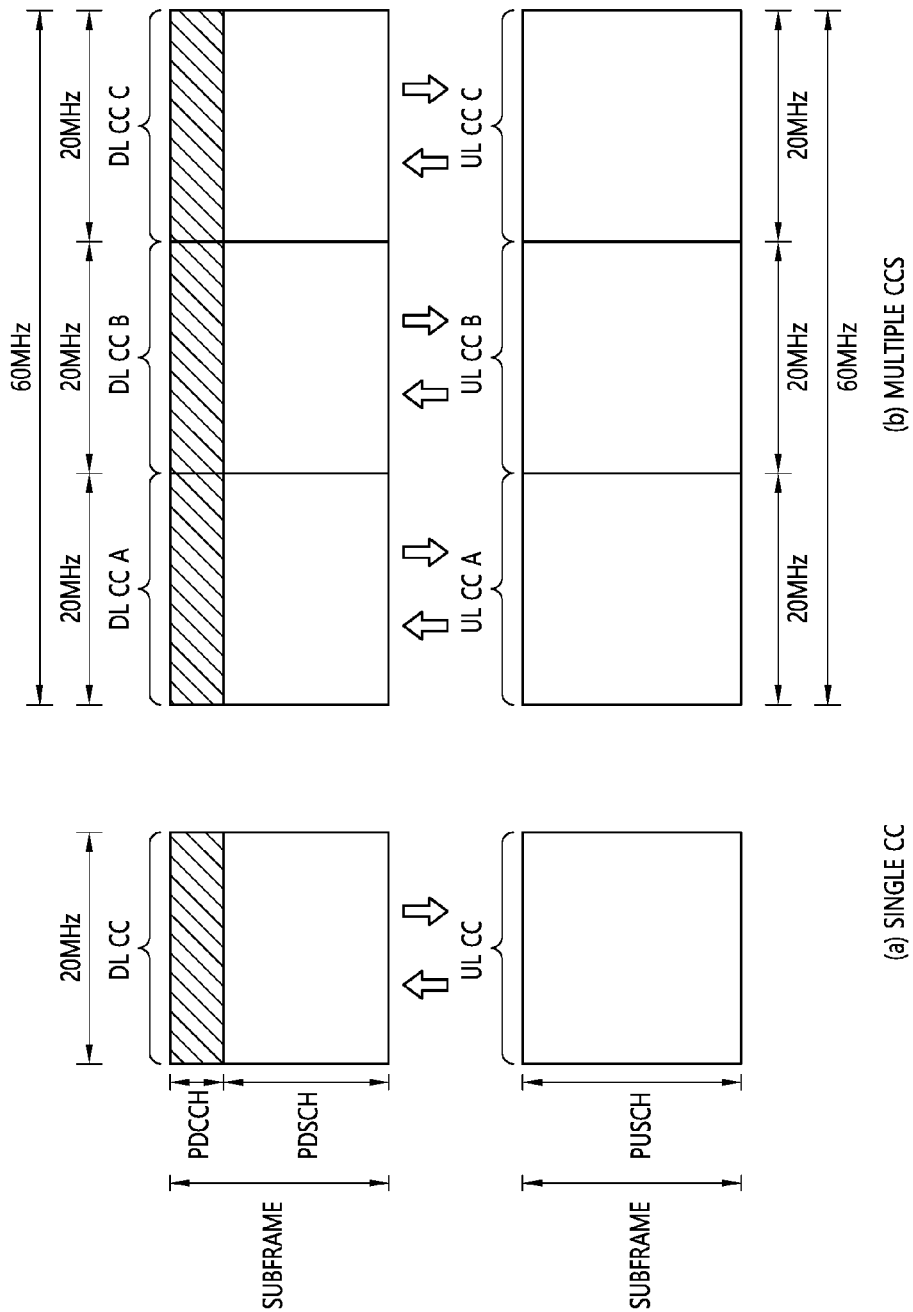
FIG. 13 is an example of a comparison between a single carrier system and a carrier aggregation system.

FIG. 13 is an example of a comparison between a single carrier system and a carrier aggregation system.

Referring to FIG. 13, in the single carrier system, only one carrier is supported for a UE in uplink and downlink. The bandwidth of carriers may be various, but a carrier allocated to a UE is one. In contrast, in the carrier aggregation (CA) system, a plurality of component carriers DL CC A to C, UL CC A to C may be allocated to a UE. For example, in order to allocate a bandwidth of 60 MHz to a UE, three component carriers each having 20 MHz may be allocated to the UE.

The carrier aggregation system may be divided into a contiguous carrier aggregation system in which carriers are contiguous and a non-contiguous carrier aggregation system in which carriers are spaced apart. If a carrier aggregation system is simply referred hereinafter, it is to be understood that the carrier aggregation system includes both a case where component carriers are contiguous and a case where component carriers are not contiguous.

A component carrier, that is, a target when one or more component carriers are aggregated, may use a bandwidth used in an existing system without any change for backward compatibility with the existing system. For example, the 3GPP LTE system supports the bandwidths of 1.4 MHz, 3 MHz, 5 MHz, 10 MHz, 15 MHz and 20 MHz. In the 3GPP LTE-A system, a broadband of 20 MHz or more may be configured using only the bandwidths of the 3GPP LTE system. Alternatively, a broadband may be configured by defining a new bandwidth without using the bandwidths of the existing system without any change.

The system frequency band of a wireless communication system is divided into a plurality of carrier frequencies. In this case, the carrier frequency means the center frequency of a cell. Hereinafter, a cell may include a pair of downlink frequency resources and uplink frequency resources. Alternatively, a cell may include only downlink frequency resources. In general, if a carrier aggregation (CA) is not taken into consideration, uplink and downlink frequency resources may always be present in pairs in one cell.

In order to perform transmission and reception of packet data through a particular cell, the terminal first needs to complete the configuration for the particular cell. Here, the configuration refers to a state where reception of the system information, which is needed for data transmission and reception for the cell, is completed. For example, the configuration may include the overall process of receiving common physical layer parameters needed for data transmission and reception, MAC layer parameters, or parameters needed for a particular operation in the RRC layer. The setting-completed cell is in a state where the packet transmission and reception becomes promptly possible if only the information indicating that the packet data may be transmitted is received.

A cell in a configuration complete state may be present in the activation or deactivation state. In this case, the activation means that the transmission or reception of data is being performed or is in the ready state. A UE may monitor or receive the control channel (PDCCH) and data channel (PDSCH) of an activated cell in order to check resources (may be a frequency, time, etc.) allocated thereto.

The deactivation means that the transmission or reception of traffic data is impossible and measurement or the transmission/reception of minimum information is possible. A UE may receive system information (SI) necessary to receive a packet from a deactivation cell. In contrast, the UE does not monitor or receive the control channel (PDCCH) and data channel (PDSCH) of a deactivated cell in order to check resources (may be a frequency, time, etc.) allocated thereto.

A cell may be divided into a primary cell (PCell), a secondary cell (SCell) and a serving cell.

When a carrier aggregation is configured, a UE has only one RRC connection with a network. In the RRC connection establishment/re-establishment/handover process, one cell provides non-access stratum (NAS) mobility information and security input. Such a cell is called a primary cell. In other words, the primary cell means a cell on which a UE performs an initial connection establishment procedure or connection re-establishment process with a BS or means a cell indicated by a primary cell in the handover process.

The secondary cell means a cell configured to provide additional radio resources after RRC connection through a primary cell was established.

The serving cell refers to a cell configured to provide a service to a UE, and is a primary cell in the case of a UE in which a carrier aggregation is not configured or to which a carrier aggregation cannot be provided. If a carrier aggregation has been configured, a plurality of serving cells may be configured. The plurality of serving cells may include a primary cell and a set of one or a plurality of all of secondary cells.

The primary component carrier (PCC) refers to a CC corresponding to the primary cell. The PCC is CC which initially forms connection or RRC connection with the base station. The PCC is a CC which is in charge of connection or RRC connection for signaling about a plurality of CCs, and manages terminal context which is connection information related with the terminal. Furthermore, the PCC always exists in the activated state when connection with the terminal is formed and the PCC is in RRC connected mode. The downlink component carrier corresponding to the primary cell is called the downlink primary component carrier (DL PCC), and the uplink component carrier corresponding to the primary cell is called the uplink primary component carrier (UL PCC).

The secondary component carrier (SCC) refers to a CC corresponding to a secondary cell. That is, the SCC is a CC allocated to the terminal except the PCC, and the SCC is an extended carrier which is extended for additional resource allocation by the terminal except the PCC and may be divided into an activate state and a deactivated state. The downlink component carrier corresponding to the secondary cell is called a downlink secondary component carrier (DL SCC), and the uplink component carrier corresponding to the secondary cell is called an uplink secondary component carrier (UL SCC).

In a component carrier forming a serving cell, a downlink component carrier may form one serving cell or a downlink component carrier and an uplink component carrier are connection-configured to form one serving cell. Conventionally, a serving cell has not included only one uplink component carrier. In the present invention, however, a serving cell may include only one uplink component carrier.

The activation/deactivation of a component carrier is the same as the concept of the activation/deactivation of a serving cell. For example, assuming that a serving cell1 includes a DL CC1, the activation of the serving cell1 means the activation of the DL CC1. Assuming that a serving cell2 is configured by connection-configuring a DL CC2 and an UL CC2, the activation of the serving cell2 means the activation of the DL CC2 and the UL CC2. In such a sense, each component carrier may correspond to a cell.

The number of component carriers aggregated in downlink and the number of component carriers aggregated in uplink may be differently set. A case where the number of downlink CCs is the same as the number of uplink CCs is called a symmetric aggregation. A case where the number of downlink CCs is different from the number of uplink CCs is called an asymmetric aggregation. Furthermore, the size (i.e., bandwidth) of CCs may be different. For example, if 5 CCs are used to configure a 70 MHz band, they may be configured like a 5 MHz CC (carrier #0)+a 20 MHz CC (carrier #1)+a 20 MHz CC (carrier #2)+a 20 MHz CC (carrier #3)+a 5 MHz CC (carrier #4).

As described above, in the carrier aggregation system, unlike in the single carrier system⁺, a plurality of serving cells, that is, a plurality of component carriers (CC), can be supported.

Meanwhile, the carrier aggregation system can support cross-carrier scheduling (CCS). The cross-carrier scheduling is a scheduling method in which the resource of a PDSCH transmitted through another component carrier can be allocated through a PDCCH transmitted through a specific component carrier and/or the resource of a PUSCH transmitted through another component carrier other than a component carrier basically linked to the specific component carrier can be allocated. That is, the PDCCH and the PDSCH may be transmitted through different DL CCs, and the PUSCH may be transmitted through an UL CC included in another cell other than an UL CC linked to a DL CC in which a PDCCH including an UL grant has been transmitted, that is, an UL CC forming the same cell. As described above, in the system supporting cross-carrier scheduling, there is a need for a carrier indicator that provides notification that a PDCCH schedules a PDSCH/PUSCH transmitted through which DL CC/UL CC. A field including such a carrier indicator is called a carrier indication field (CIF).

The carrier aggregation system supporting cross-carrier scheduling may include a carrier indication field (CIF) in a conventional downlink control information (DCI) format. In the system supporting cross-carrier scheduling, for example, in the LTE-A system, 3 bits may be extended because the CIF is added to the existing DCI format (i.e., the DCI format used in LTE). The existing coding method, resource allocation method (i.e., CCE-based resource mapping) may be reused in the PDCCH structure.

A BS may configure a PDCCH monitoring DL CC set. The PDCCH monitoring DL CC set includes some or all of aggregated DL CCs. When cross-carrier scheduling is configured, a UE performs PDCCH monitoring/decoding on only the DL CCs included in the PDCCH monitoring DL CC set. In other words, the BS sends a PDCCH for a PDSCH/PUSCH to be scheduled through only the DL CC included in the PDCCH monitoring DL CC set. The PDCCH monitoring DL CC set may be configured in a UE-specific, UE group-specific or cell-specific way.

Non-cross carrier scheduling (NCCS) means that scheduling information and corresponding data are received/transmitted within the same carrier (cell), and is also called self-scheduling. Non-cross carrier scheduling may be called a scheduling method applied to a UE in which only a single cell has been configured in a conventional technology.

Hereinafter, a Sounding Reference Symbol (SRS) transmission-related triggering (or request) message type and/or SRS transmission and/or dropping operation is described.

Trigger includes two types: 1) a trigger type 0 based on higher layer signaling and 2) a trigger type 1 based on the DCI format 0/4/1A for Frequency Division Duplex (FDD) and Time Division Duplex (TDD) and the DCI format 2B/2C/2D for TDD.

Regarding the trigger type 1 and the DCI format 4, three sets of SRS parameters (e.g., srs-ConfigApDCI-Format4) may be set by higher layer signaling. In this case, in the DCI format 4, an SRS request field of 2 bits may indicate an SRS parameter set given in Table 3 below. Table 3 corresponds to the contents of an example of SRS request value for the trigger type 1 in the DCI format 4.

TABLE 3

| VALUE OF SRS REQUEST FIELD | CONTENTS |
|---|---|
| 00 | NO TYPE 1 SRS TRIGGER |
| 01 | A first SRS parameter set is configured by a higher layer |
| 10 | A second SRS parameter set is configured by a higher layer |
| 11 | A third SRS parameter set is configured by a higher layer |

Regarding the trigger type 1 and the DCI format 0, a single set (e.g., srs-ConfigApDCI-Format0) of an SRS parameter may be configured by higher layer signaling.

Regarding the trigger type 1 and the DCI format 1A/2B/2C/2D, a single common set (e.g., srs-ConfigApDCI-Format1a2b2c) of an SRS parameter may be configured by a higher layer.

In this case, regarding the DCI format 0/1A/2B/2C/2D, an SRS request field may be 1 bi. If the value of the SRS request field is set to '1', the type 1 SRS may be triggered. If an SRS parameter regarding the DCI format 0/1A/2B/2C/2D from higher layer signaling has been configured in a UE, the SRS request field of 1 bit may be included in the DCI format 0/1A for the frame structure type 1 and the DCI format 0/1A/2B/2C/2D regarding the frame structure type 2.

When SRS transmission and physical uplink shared channel (PUSCH) transmission overlap within the same symbol, a UE in which MTAGs have not been configured should not send an SRS in a symbol.

If MTAGs have not been configured in a UE or if MTAGs are configured in a UE and the configurations of an SRS and the PUCCH format 2/2a/2b are generated at the same time in the same subframe within the same serving cell, When a type 0-triggered SRS and the PUCCH format 2/2a/2b are generated at the same time in the same subframe, the UE is prohibited from sending the type 0-triggered SRS.

When the format 2 is generated at the same time along with a type 1-triggered SRS and the PUCCH format 2a/2b or HARQ-ACK transmission in the same subframe, the UE is prohibited from sending the type 1-triggered SRS.

When the PUCCH format 2 other than a type 1-triggered SRS and HARQ-ACK transmission is generated at the same time in the same subframe, the UE is prohibited from sending the PUCCH format 2.

If MTAGs have not been configured in a UE or if MTAGs are configured and the configurations of an SRS and a PUCCH are generated at the same time in the same subframe within the same serving cell, If a parameter ackNackSRS-SimultaneousTransmission is FALSE, when the transmission of the SRS and the transmission of the PUCCH on which HARQ-ACK and/or a positive SR are carried in the same subframe are generated at the same time, the UE is prohibited from sending the SRS.

Regarding FDD-TDD and a primary cell frame structure 1, if the parameter ackNackSRS-SimultaneousTransmission is TRUE, when the transmission of the SRS using a shortened format and the transmission of PUCCH on which HARQ-ACK and/or a positive SR are carried are generated at the same time in the same symbol, the UE is prohibited from sending the SRS in a symbol.

If other prohibitions are not present and the parameter ackNackSRS-SimultaneousTransmission is TRUE, when the transmission of an SRS using a shortened format and the transmission of a PUCCH on which HARQ-ACK and/or a positive SR are carried are generated at the same time in the same subframe, the UE should send the SRS in a symbol.

When the transmission of an SRS on any serving cell and the transmission of a PUCCH on which HARQ-ACK and/or a positive SR using a normal PUCCH format are carried are generated at the same time in the same subframe, a UE in which MTAGs have been configured is prohibited from sending the SRS.

When the transmission of an SRS is temporarily overlapped with a PRACH region with respect to the preamble format 4 in an Uplink Pilot Time Slot (UpPTS) or exceeds the range of an uplink system bandwidth configured in a serving cell, a UE may be prohibited from sending the SRS.

If a UE has been configured to support the transmission of HARQ-ACK on a PUCCH and an SRS in one subframe, the parameter ackNackSRS-SimultaneousTransmission provided by a higher layer may be determined as follows. If ackNackSRS-SimultaneousTransmission has been configured to support the transmission of HARQ-ACK on a PUCCH and an SRS on one subframe, a UE may send the HARQ-ACK and an SR using a shortened PUCCH format in a cell-specific SRS subframe of a primary cell. In this case, HARQ-ACK or an SR symbol corresponding to an SRS location is punctured.

Although a UE has not sent an SRS in a subframe, such a shortened PUCCH format may be used in a cell-specific SRS subframe of a primary cell. In contrast, the UE may use the normal PUCCH format 1/1a/1b or the normal PUCCH format 3 in order to send HARQ-ACK and an SR.

Furthermore, whether an SRS will be finally transmitted is determined by taking into consideration whether a multiple tag (hereinafter referred to as "MTAG") has been set and/or whether the total transmission power of a UE exceeds $P_{CMAX}$ in a symbol portion overlapped between the transmission of another channel and the transmission of an SRS, and a detailed example thereof is as follows.

Regarding a PUCCH or SRS, transmission power $\hat{P}_{PUCCH}(i)$ or $\hat{P}_{SRS,c}(i)$ is identically divided across antennas configured for the PUCCH or SRS. In this case, $\hat{P}_{SRS,c}(i)$ corresponds to a linear value of $P_{SRS,c}(i)$.

If MTAGs are configured in a UE and the transmission of an SRS by the UE in a symbol on a subframe i for a given serving cell in one TAG is the same or overlapped with the transmission of a PUCCH/PUSCH on a subframe i or a subframe i+1 for another serving cell in the other TAG, when total transmission power exceeds $P_{CMAX}$ in any overlapped portion of the symbol, the UE may need to drop the SRS.

If MTAGs and 2 or more serving cells are configured in a UE and the transmission of an SRS by the UE in a symbol on a subframe i for a given serving cell is overlapped with the transmission of a PUCCH/PUSCH on a subframe i or subframe i+1 for another serving cell(s) and the transmission of an SRS on a subframe I for another serving cell, when total transmission power exceeds $P_{CMAX}$ in any overlapped portion of the symbol, the UE may need to drop the SRS.

If MTAGs are configured in a UE and the transmission of a PRACH in a secondary serving cell parallel to the transmission of an SRS in a symbol on the subframe of another serving cell related to another TAG is requested by a higher layer, when total transmission power exceeds $P_{CMAX}$ in any overlapped portion of the symbol, the UE may need to drop the SRS.

If total transmission power of a UE for an SRS in an SC-FDMA symbol exceeds $\hat{P}_{CMAX}(i)$, the UE may scale a serving cell c and $\hat{P}_{SRS,c}(i)$ for SC-FDMA in a subframe i so that they satisfy Equation 3. In this case, Equation 3 is as follows.

$$\sum_c w(i) \cdot \hat{P}_{SRS,c}(i) \le \hat{P}_{CMAX}(i) \qquad \text{[Equation 3]}$$

In this case, $\hat{P}_{SRS,c}(i)$ may mean a linear value of $P_{SRS,c}(i)$ and $\hat{P}_{CMAX}(i)$ may mean a linear value of $P_{CMAX}$ in the subframe i. Furthermore, w(i) may mean the scaling factor of $\hat{P}_{SRS,c}(i)$ for the serving cell c in $0 < w(i) \le 1$. In this case, the value of w(i) has the same value in all of serving cells.

If MTAGs are configured in a UE and the transmission of an SRS by the UE in an SC-FDMA symbol for a serving cell in a subframe i in one TAG is overlapped with the transmission of an SRS in another SC-FDMA symbol in a subframe i for a serving cell in the other TAG and total transmission power of the UE for the SRS does not exceed $\hat{P}_{CMAX}(i)$ in the overlapped portion, the UE may scale $\hat{P}_{SRS,c}(i)$ with respect to a serving cell c and each SRS SC-FDMA overlapped in the subframe i so that $\hat{P}_{SRS,c}(i)$ satisfies Equation 4. In this case, Equation 4 is as follows.

$$\sum_c w(i) \cdot \hat{P}_{SRS,c}(i) \le \hat{P}_{CMAX}(i) \qquad \text{[Equation 4]}$$

In this case, $\hat{P}_{SRS,c}(i)$ means a linear value of $P_{SRS,c}(i)$ $\hat{P}_{CMAX}(i)$ is a linear value of $P_{CMAX}$ defined in the subframe i, and w(i) means the scaling factor of $\hat{P}_{SRS,c}(i)$ for the serving cell c that satisfies $0 < w(i) \le 1$. In this case, the value of w(i) has the same value in all of serving cells.

Figure 14:
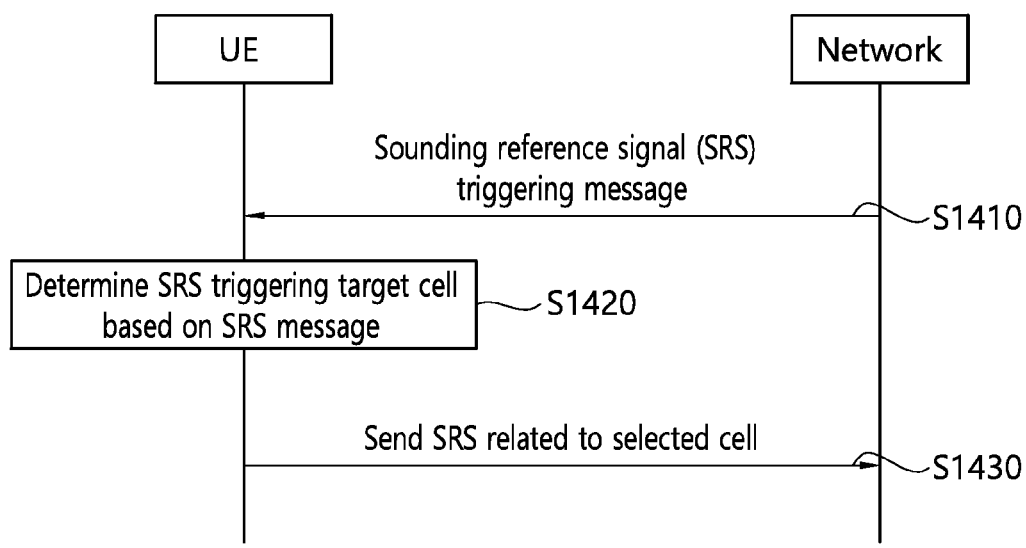
FIG. 14 is a flowchart of an existing SRS triggering method.

FIG. 14 is a flowchart of an existing SRS triggering method.

Referring to FIG. 14, a UE receives an SRS triggering message from a network (S1410). Hereinafter, detailed contents of the SRS triggering message received by the UE are described later.

Thereafter, the UE determines an SRS triggering target cell based on the SRS message (S1420). Hereinafter, detailed contents of the SRS triggering target cell are described later.

The UE sends an SRS related to the selected cell to the network (S1430). A detailed example of the SRS transmitted from the UE to the network is described later.

Figure 15:
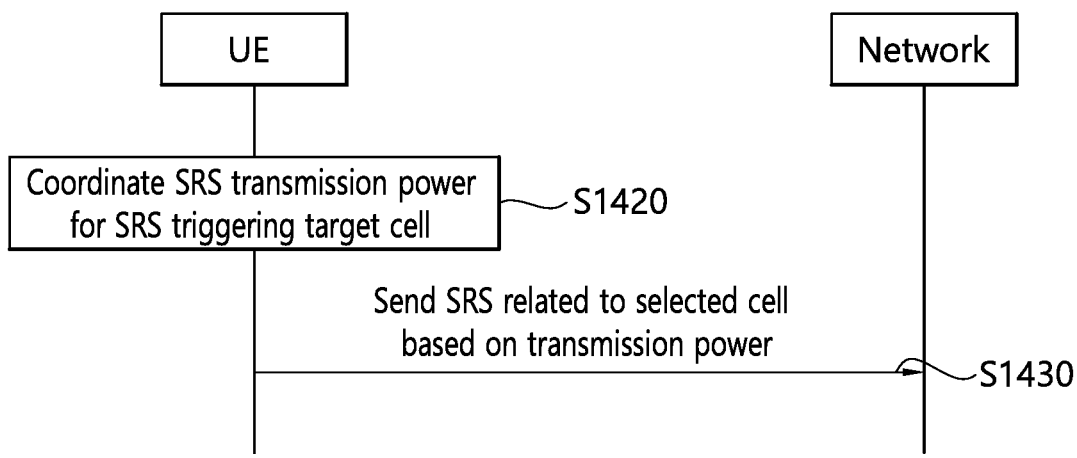
FIG. 15 is a flowchart of an existing SRS transmission power coordination method.

FIG. 15 is a flowchart of an existing SRS transmission power coordination method.

Referring to FIG. 15, a UE coordinates SRS transmission power for an SRS triggering target cell (S1510). Detailed contents of the SRS transmission power coordination are described later.

Thereafter, the UE sends an SRS related to the selected cell to a network based on the transmission power (S1520). In this case, a detailed example of a method for sending, by the UE, the SRS to the network based on the transmission power is described later.

Hereinafter, the present invention is described in detail.

As described above, in a wireless communication system, for communication efficiency, a method of aggregating a plurality of carriers, that is, a carrier aggregation, is adopted. In this case, in order to support a large amount of (DL and/or UL) data, a carrier aggregation scheme may be configured with respect to a large number (e.g., a maximum of 32) of cells. In this case, if a large number of cells is configured according to a carrier aggregation scheme, a network needs to send an SRS trigger (or request) message to a UE with respect to each of a large number of cells. For this reason, if a large number of cells has been configured according to a carrier aggregation scheme, there is a problem in that the number of SRS trigger messages that must be transmitted from the network to the UE is excessively increased. As a result, there is a problem in that overall efficiency of the wireless communication system is deteriorated because wireless communication resources are excessively used.

Accordingly, in the present invention, in order to support an increasing downlink (DL) and/or uplink (UL)) data demand, if a large number of cell(s) have been configured according to a carrier aggregation scheme, efficient Sounding Reference Signal (SRS) transmission methods are proposed. For convenience of description, hereinafter, a cell based on a licensed spectrum and an (S)cell based on an unlicensed spectrum (LTE-UnLicensed Spectrum; LTE-U) are called an "LCELL" and a "UCELL", respectively. Furthermore, a resource interval aperiodically secured and/or configured in a corresponding UCELL may be called a "Reserved Resource Period (RRP)." Furthermore, a rule may be defined so that a PDSCH-related control information channel transmitted on a downlink subframe (DL SF), that is, a subframe designed for a downlink use, in the RRP interval (or a PUSCH-related control information channel transmitted on an uplink subframe (UL SF), that is, a subframe designed for an uplink use, in the RRP interval) may be configured to be transmitted from a previously defined LCELL (hereinafter referred to as "cross-carrier scheduling (CCS)") or may be transmitted from the same UCELL (hereinafter referred to as "self-scheduling (SFS)"). Furthermore, a PDSCH reception-related downlink control information channel on the RRP interval may be implemented in such a way as to schedule one PDSCH through one downlink control information channel is received at the same (or a specific) point of time (hereinafter referred to as "single subframe scheduling (SSFS)") or may be implemented in such a way as to schedule a previously defined (or signaled) number of PDSCHs received at different points of time in addition to one PDSCH through which one downlink control information channel is received at the same (or a specific) point of time (Hereinafter referred to as "multi-subframe scheduling (MSFS)").

When the RRP interval on a UCELL is a resource aperiodically or discontiguously configured depending on CS results, the corresponding RRP interval may be (re)defined (or (re)interpreted) from a viewpoint of a UE operation and process. In this case, for example, the RRP interval in the UCELL may be defined or redefined as 1) the interval in which the UE is assumed to perform a (time and/or frequency) sync operation on the UCELL or a sync signal (e.g., PSS and/or SSS) for the (time and/or frequency) sync operation is assumed to be transmitted by a network (e.g., eNB) and/or 2) the interval in which the UE is assumed to perform a CSI measurement operation on the UCELL or a reference signal (e.g., CRS, CSI-RS) for the CSI measurement operation is assumed to be transmitted by a network (e.g., eNB) and/or 3) the interval in which the UE performs a DCI detection operation related to data transmission (or reception) in the UCELL and/or 4) the interval in which the UE performs a temporary or provisional buffering operation on a signal received in the UCELL.

Hereinafter, for convenience of description, a proposed method is described based on an 3GPP LTE system. However, the range of a system to which the proposed method is applied may be extended to other systems in addition to the 3GPP LTE system. Prior to a detailed description of the proposed method, an example of an aperiodic SRS (A-SRS) transmission-related triggering (or request) message type and/or an SRS transmission/dropping operation is the same as that described above. In this case, for example, the aforementioned trigger type 0 corresponds to a periodic SRSP-SRS, and the trigger type 1 corresponds to an A-SRS.

The following proposed methods propose methods for simultaneously efficiently triggering cell(s)-related A-SRS(s) if the number of cell(s) (i.e., N) greater than that of the existing method is configured according to a carrier aggregation scheme (i.e., called a "massive CA"). In this case, N corresponding cell(s) may include only LCELL(s) or may include only UCELL(s) or may include a combination of an LCELL(s) and a UCELL(s).

Through the application of the proposed methods to be described later, A-SRS triggering message (e.g., DCI) overhead required to simultaneously trigger a plurality of cell(s)-related A-SRS(s) can be reduced. Furthermore, there is an effect in that when the transmission of a plurality of cell(s)-related A-SRS(s) is efficiently triggered, a plurality of pieces of cell(s)-related uplink channel state information (hereinafter referred to as "UL CSI") can be effectively obtained based on the proposed methods. Furthermore, when the transmission of a plurality of cell(s)-related A-SRS(s) is efficiently triggered, pieces of downlink channel state information (hereinafter referred to as "DL CSI") in addition to an UL CSI(s) can be effectively obtained due to a channel reciprocity characteristic in the case of a TDD cell(s) based on the proposed methods to be described later. Furthermore, if a large number of cells compared to the existing method is configured according to a carrier aggregation scheme, the transmission and/or reception operation of corresponding cell(s)-related data and/or control (or scheduling) information can be efficiently operated (or managed) by configuring cell groups (CG). In this case, a cell in which PUCCH transmission is performed for each CG and/or a cell in which a common search space (CSS) is configured may be independently configured. Furthermore, a specific CG may include a combination of a UCELL(s) and an LCELL(s) or may include only an LCELL(s) or may include only a UCELL(s). Hereinafter, if a large number of cells are configured according to a carrier aggregation scheme, that is, an SRS transmission process in a massive CA is proposed in detail through the drawings. For convenience of description, an A-SRS triggering message is called an "A-SRS_TR_MG."

An SRS transmission process in the aforementioned massive CA may be basically divided into two. 1. A method for performing SRS triggering through an SRS triggering message in a massive CA and 2. A method for coordinating SRS transmission power in a massive CA. Hereinafter, 1. The method for performing SRS triggering in a massive CA and 2. The method for coordinating SRS transmission power in a massive CA are described in more detail below with reference to the drawings.

First, 1. The method for performing SRS triggering through an SRS triggering message in a massive CA is described in detail with reference to the drawing.

Figure 16:
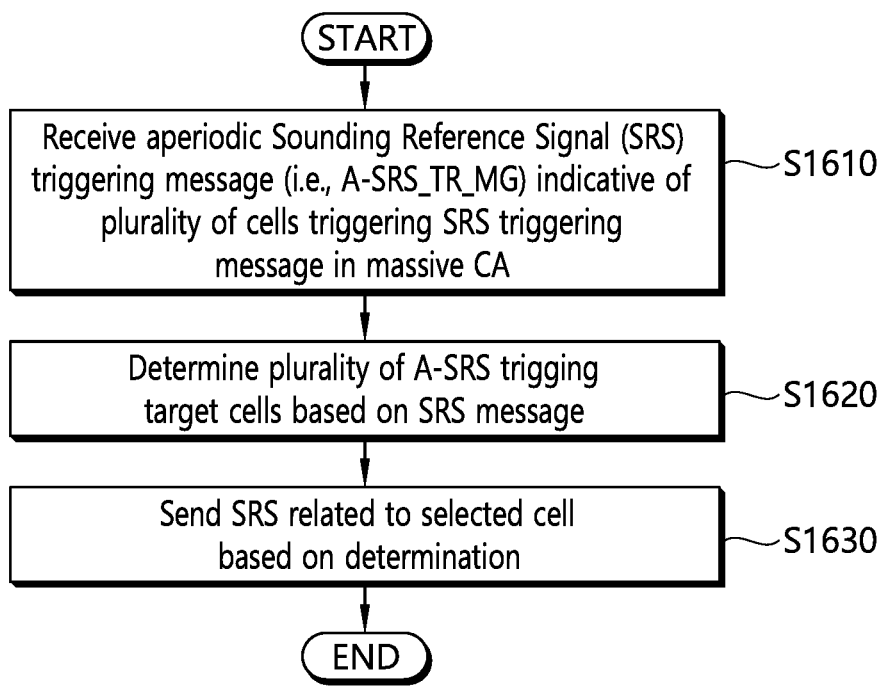
FIG. 16 is a flowchart of the method for performing SRS triggering through an SRS triggering message in a massive CA according to an embodiment of the present invention.

FIG. 16 is a flowchart of the method for performing SRS triggering through an SRS triggering message in a massive CA according to an embodiment of the present invention.

Referring to FIG. 16, a UE may receive an SRS triggering message (S1610). In this case, the SRS triggering message may be an aperiodic SRS triggering message (i.e., A-SRS_TR_MG). In this case, information indicative of a target cell triggering the aperiodic SRS may include information indicative of a cell or cell group configured in the UE.

Hereinafter, the A-SRS_TR_MG received by the UE is described through detailed categories applied to the A-SRS_TR_MG.

Category 1

In the existing technology, in a carrier aggregation situation, an SRS parameter set or SRS parameter sets are independently configured for each cell, and one A-SRS_TR_MG can trigger only one cell-related A-SRS indicated (or scheduled) by a corresponding A-SRS_TR_MG. However, under a massive CA situation, a plurality of cell(s)-related A-SRSs can be triggered, that is, A-SRSs, can be simultaneously triggered with relatively small A-SRS_TR_MG overhead by applying some or all of the following rules.

In this case, through the application of some or all of the following rules, the transmission of A-SRSs related to a plurality of cell(s) can be simultaneously triggered through A-SRS triggering DCI indicative of (or scheduling) one cell or a piece of A-SRS triggering DCI. Furthermore, through the application of some or all of the following rules, in the state in which a plurality of A-SRS transmission candidate cells or candidate cell sets have been previously designated through higher layer signaling (e.g., RRC signaling), A-SRS transmission for one of a plurality of corresponding candidate cells or candidate cell sets may be indicated by DCI. In this case, for example, one of the plurality of candidates may be designated as a scheduled cell itself or a cell set including the scheduled cell. Furthermore, each of the candidates may be set as a cell set including one cell or a plurality of cell(s). Furthermore, some or all of the following rules may be limitedly applied to only a case where a carrier aggregation-related (UL) cell(s) are configured to be greater than a previously defined (or signaled) number (hereinafter referred to as "P"). For example, a corresponding P value may be set to 5.

Furthermore, for example, a rule may be defined so that Category 1 is limitedly applied only when the A-SRS_TR_MG is transmitted on a USS. Furthermore, for example, Category 1 may be limitedly applied to a TDD system (or TDD cell)-related A-SRS_TR_MG (and/or an FDD system (or FDD cell)-related A-SRS_TR_MG). Furthermore, for example, if a UCELL-related A-SRS is triggered on some or all of the following rules, actual A-SRS transmission on a corresponding UCELL may be limited performed only when a clear channel assessment (CCA) result of a UE are IDLE.

In this case, the A-SRS_TR_MG may be defined as in the following detailed examples.

1) Example 1

A "cell set in which an A-SRS is triggered (hereinafter referred to as an "A-SRS_CL_SET") and/or an "SRS parameter set (hereinafter referred to as an "A-SRS_PR_SET")" may be configured (or signaled) independently or differently for each (UL) cell indicated (or scheduled) by an A-SRS_TR_MG (or for each (DL) cell in which an A-SRS_TR_MG has been received).

For example, an (UL) cell indicated (or scheduled) by an A-SRS_TR_MG may be construed as a cell(s) indicated by the A-SRS_TR_MG or the carrier indication field (CIF) of the A-SRS_TR_MG. That is, the (UL) cell indicated (or scheduled) by the A-SRS_TR_MG may be construed as a cell(s) indicated by the A-SRS_TR_MG or the CIF of the A-SRS_TR_MG rather than the concept of a cell(s) in which A-SRS transmission is finally triggered (or performed). For a detailed example, under a situation in which 12 cell(s) (e.g., a CELL#0, a CELL#1, . . . , a CELL#10 and a CELL#11) have been configured as a massive CA, if an A-SRS_TR_MG (e.g., a (DIC format 4) the SRS request field of 2 bits) indicates (or schedules) the CELL#0 and the CELL#1 at different points of time, the final A-SRS_CL_SET and/or A-SRS_PR_SET may be determined based on Table 3 or Table 4 below.

TABLE 4

| VALUE OF SRS REQUEST FIELD | A-SRS_TR_MG (I.E., THE SRS REQUEST FIELD OF 2 BITS) INDICATES (OR SCHEDULES) CELL#0 | A-SRS_TR_MG (I.E., THE SRS REQUEST FIELD OF 2 BITS) INDICATES (OR SCHEDULES) CELL#1 |
|---|---|---|
| '00' | NO TYPE 1 SRS TRIGGER | NO TYPE 1 SRS TRIGGER |
| '01' | CELL#0 (and/or a previously configured SRS parameter set), CELL#6 (and/or a previously configured SRS parameter set) | CELL#1 (and/or a previously configured SRS parameter set), CELL#7 (and/or a previously configured SRS parameter set) |
| '10' | CELL#2 (and/or a previously configured SRS parameter set), CELL#8 (and/or a previously configured SRS parameter set) | CELL#3 (and/or a previously configured SRS parameter set), CELL#9 (and/or a previously configured SRS parameter set) |
| '11' | CELL#4 (and/or a previously configured SRS parameter set), CELL#10 (and/or a previously configured SRS parameter set) | CELL#5 (and/or a previously configured SRS parameter set), CELL#11 (and/or a previously configured SRS parameter set) |

TABLE 5

| VALUE OF SRS REQUEST FIELD | A-SRS_TR_MG (I.E., THE SRS REQUEST FIELD OF 2 BITS) INDICATES (OR SCHEDULES) CELL#0 | A-SRS_TR_MG (I.E., THE SRS REQUEST FIELD OF 2 BITS) INDICATES (OR SCHEDULES) CELL#1 |
|---|---|---|
| '00' | NO TYPE 1 SRS TRIGGER | NO TYPE 1 SRS TRIGGER |
| '01' | CELL#0 (and/or a previously configured SRS parameter set) | CELL#1 (and/or a previously configured SRS parameter set) |
| '10' | CELL#0 (and/or a previously configured SRS parameter set), CELL#4 (and/or a previously configured SRS parameter set), CELL#8 (and/or a previously configured SRS parameter set) | CELL#1 (and/or a previously configured SRS parameter set), CELL#5 (and/or a previously configured SRS parameter set), CELL#9 (and/or a previously configured SRS parameter set) |
| '11' | CELL#2 (and/or a previously configured SRS parameter set), CELL#6 (and/or a previously configured SRS parameter set), CELL#10 (and/or a previously configured SRS parameter set) | CELL#3 (and/or a previously configured SRS parameter set), CELL#7 (and/or a previously configured SRS parameter set), CELL#11 (and/or a previously configured SRS parameter set) |

In this case, in the case of cross-scheduling, whether an A-SRS_TR_MG indicates the CELL#0 or the CELL#1 may be determined through a CIF, for example. Furthermore, in the case of self-scheduling, whether an A-SRS_TR_MG indicates the CELL#0 or the CELL#1 may be determined through an uplink CC paired with a downlink CC in which an UL grant is received, for example.

In this case, an SRS parameter set for each cell corresponding to a specific SRS request field state may be independently (or differently) configured for each cell or may be independently (or differently) configured for each cell type or may be configured in common between previously configured (or signaled) cell(s) (i.e., a previously configured (or signaled) SRS parameter set may be applied in common). Furthermore, for example, an SRS parameter set for each cell between different (SRS request field) states may be independently (or differently) configured between different (SRS request field) states or may be configured in common. Furthermore, a previously configured (or signaled) common A-SRS_CL_SET and/or A-SRS_PR_SET may be configured (or applied) between (UL) cells indicated (or scheduled) by an A-SRS_TR_MG (or (DL) cells in which an A-SRS_TR_MG has been received).

2) Example 2

An A-SRS_CL_SET and/or an A-SRS_PR_SET may be independently (or differently) configured (or signaled) for each CG including an (UL) cell indicated (or scheduled) by an A-SRS_TR_MG (or for each CG including a (DL) cell in which an A-SRS_TR_MG has been received).

In this case, for example, the (UL) cell indicated (or scheduled) by the A-SRS_TR MG may be construed as a cell(s) indicated by the A-SRS_TR_MG or the CIF of the A-SRS_TR_MG. That is, the (UL) cell indicated (or scheduled) by the A-SRS_TR_MG may be construed as a cell(s) indicated by the A-SRS_TR_MG or the CIF of the A-SRS_TR_MG rather than the concept of a cell(s) in which A-SRS transmission is finally triggered (or performed).

For a detailed example, under a situation in which 12 cells (e.g., a CELL#0, a CELL#1, . . . , a CELL#10 and a CELL#11) have been configured as a massive CA, if 2 CG(s) are configured, if an A-SRS_TR_MG (e.g., a (DIC format 4) the SRS request field of 2 bits) indicates the CELL#0 of a CG#0 and the CELL#6 of a CG#1 at different points of time, the final A-SRS_CL_SET and/or A-SRS_PR_SET may be determined based on Table 5 below.

TABLE 6

| VALUE OF SRS REQUEST FIELD | A-SRS_TR_MG (I.E., THE SRS REQUEST FIELD OF 2 BITS) INDICATES (OR SCHEDULES) CELL(S) ON CG#0 | A-SRS_TR_MG (I.E., THE SRS REQUEST FIELD OF 2 BITS) INDICATES (OR SCHEDULES) CELL(S) ON CG#1 |
|---|---|---|
| '00' | NO TYPE 1 SRS TRIGGER | NO TYPE 1 SRS TRIGGER |
| '01' | CELL#0 (and/or a previously configured SRS parameter set), CELL#3 (and/or a previously configured SRS parameter set), | CELL#6 (and/or a previously configured SRS parameter set), CELL#9 (and/or a previously configured SRS parameter set) |
| '10' | CELL#1 (and/or a previously configured SRS parameter set), CELL#4 (and/or a previously configured SRS parameter set), | CELL#7 (and/or a previously configured SRS parameter set), CELL#10 (and/or a previously configured SRS parameter set) |
| '11' | CELL#2 (and/or a previously configured SRS parameter set), CELL#5 (and/or a previously configured SRS parameter set), | CELL#8 (and/or a previously configured SRS parameter set), CELL#11 (and/or a previously configured SRS parameter set) |

In this case, for example, it was assumed that the CG#0 included the CELL#0, CELL#1, CELL#2, CELL#3, CELL#4 and CELL#5 and the CG#1 included the CELL#6, CELL#7, CELL#8, CELL#9, CELL#10 and CELL#11. Furthermore, for example, in Table 5, a cell(s) in which an A-SRS is simultaneously triggered may be construed as being limited to a cell(s) on a CG including an (UL) cell indicated (or scheduled) by an A-SRS_TR_MG (or a cell(s) on a CG including a (DL) cell in which an A-SRS_TR_MG has been received). Furthermore, an SRS parameter set for each cell corresponding to a specific (SRS request field) state may be independently (or differently) configured for each cell or may be independently (or differently) configured for each cell type or may be configured in common between previously configured (or signaled) cell(s) (i.e., a previously configured (or signaled) SRS parameter set may be applied in common). Furthermore, the SRS parameter set may be independently (or differently) configured for each CG or may be configured in common between (some or all of) CGs. Furthermore, an SRS parameter set for each cell between different (SRS request field) states may be independently (or differently) configured between different (SRS request field) states or may be configured in common. For another example, a previously configured (or signaled) common A-SRS_CL_SET and/or A-SRS_PR_SET may be configured (or applied) between CGs including an (UL) cell indicated (or scheduled) by an A-SRS_TR_MG (or CGs including a (DL) cell in which an A-SRS_TR_MG has been received).

3) Example 3

A "CG set in which an A-SRS is triggered (hereinafter referred to as an "A-SRS_CG_SET")" and/or an A-SRS_PR_SET may be independently (or differently) configured (or signaled) for each (UL) cell indicated (or scheduled) by an A-SRS_TR_MG (or for each (DL) cell in which an A-SRS_TR_MG has been received). In this case, the (UL) cell indicated (or scheduled) by the A-SRS_TR_MG may be construed as a cell(s) indicated by the A-SRS_TR_MG or the CIF of the A-SRS_TR_MG. That is, the (UL) cell indicated (or scheduled) by the A-SRS_TR_MG may be construed as a cell(s) indicated by the A-SRS_TR_MG or the CIF of the A-SRS_TR_MG rather than the concept of a cell(s) in which A-SRS transmission is finally triggered (or performed).

For a detailed example, under a situation in which 12 cells (i.e., a CELL#0, a CELL#1, . . . , a CELL#10 and a CELL#11) have been configured as a massive CA, if 4 CG(s) have been configured, if an A-SRS_TR_MG (i.e., a (DIC format 4) the SRS request field of 2 bits) indicates the CELL#0 and the CELL#6 at different points of time, the final A-SRS_CG_SET and/or A-SRS_PR_SET may be determined based on Table 6.

TABLE 7

| VALUE OF SRS REQUEST FIELD | A-SRS_TR_MG (I.E., THE SRS REQUEST FIELD OF 2 BITS) INDICATES (OR SCHEDULES) CELL#0 | A-SRS_TR_MG (I.E., THE SRS REQUEST FIELD OF 2 BITS) INDICATES (OR SCHEDULES) CELL#6 |
|---|---|---|
| '00' | NO TYPE 1 SRS TRIGGER | NO TYPE 1 SRS TRIGGER |
| '01' | CELL#0 (and/or a previously configured SRS parameter set), CELL#1 (and/or a previously configured SRS parameter set), CELL#2 (and/or a previously configured SRS parameter set) (i.e., it may be construed that the A-SRS(s) of a cell(s) forming the CG#0 has been triggered) | CELL#6 (and/or a previously configured SRS parameter set), CELL#7 (and/or a previously configured SRS parameter set), CELL#8 (and/or a previously configured SRS parameter set) (i.e., it may be construed that the A-SRS(s) of a cell(s) forming the CG#2 has been triggered) |
| '10' | CELL#3 (and/or a previously configured SRS parameter set), CELL#4 (and/or a previously configured SRS parameter set), CELL#5 (and/or a previously configured SRS parameter set) | CELL#9 (and/or a previously configured SRS parameter set), CELL#10 (and/or a previously configured SRS parameter set), CELL#11 (and/or a previously configured SRS parameter set) |

TABLE 7-continued

| VALUE OF SRS REQUEST FIELD | A-SRS_TR_MG (I.E., THE SRS REQUEST FIELD OF 2 BITS) INDICATES (OR SCHEDULES) CELL#0 | A-SRS_TR_MG (I.E., THE SRS REQUEST FIELD OF 2 BITS) INDICATES (OR SCHEDULES) CELL#6 |
|---|---|---|
| '11' | (i.e., it may be construed that the A-SRS(s) of a cell(s) forming the CG#1 has been triggered) CELL#0 (and/or a previously configured SRS parameter set), CELL#1 (and/or a previously configured SRS parameter set), CELL#2 (and/or a previously configured SRS parameter set) CELL#3 (and/or a previously configured SRS parameter set), CELL#4 (and/or a previously configured SRS parameter set), CELL#5 (and/or a previously configured SRS parameter set) (i.e., it may be construed that the A-SRS(s) of a cell(s) forming the CG#1 and the CG#2 have been triggered) | (i.e., it may be construed that the A-SRS(s) of a cell(s) forming the CG#3 has been triggered) CELL#6 (and/or a previously configured SRS parameter set), CELL#7 (and/or a previously configured SRS parameter set), CELL#8 (and/or a previously configured SRS parameter set) CELL#9 (and/or a previously configured SRS parameter set), CELL#10 (and/or a previously configured SRS parameter set), CELL#11 (and/or a previously configured SRS parameter set) (i.e., it may be construed that the A-SRS(s) of a cell(s) forming the CG#2 and CG#3 have been triggered) |

In Table 7, for example, it was assumed that the CG#0 included the CELL#0, CELL#1 and CELL#2, the CG#1 included the CELL#3, CELL#4 and CELL#5, the CG#2 included the CELL#6, CELL#7 and CELL#8, and the CG#3 included the CELL#9, CELL#10 and CELL#11. Furthermore, for example, an SRS parameter set for each cell corresponding to a specific (SRS request field) state may be independently (or differently) configured for each cell or may be independently (or differently) configured for each cell type or may be configured in common between previously configured (or signaled) cell(s) (i.e., a previously configured (or signaled) SRS parameter set may be applied in common). Furthermore, for example, the SRS parameter set may be independently (or differently) configured for each CG or may be configured in common between some or all of the CGs. Furthermore, for example, an SRS parameter set for each cell between different (SRS request field) states may be independently (or differently) configured between different (SRS request field) states or may be configured in common. For another example, a previously configured (or signaled) common A-SRS_CG_SET and/or A-SRS_PR_SET may be configured (or applied) between (UL) cells indicated (or scheduled) by an A-SRS_TR_MG (or (DL) cells in which an A-SRS_TR_MG has been received).

4) Example 4

An A-SRS_CL_SET (or A-SRS_CG_SET) and/or an A-SRS_PR_SET may be independently (or differently) configured (or signaled) for each subframe (SF) (set). In this case, for example, corresponding SF set information may be signaled in a bitmap form along with the period. For example, a rule may be defined so that the bitmap information is repeatedly applied based on the period.

For a detailed example, under a situation in which 12 cells (i.e., a CELL#0, CELL#1, . . . , CELL#10 and CELL#11) have been configured as a massive CA, in the case where bitmap information related to a 2-SF set configuration and period information of 10 ms are signaled, if an A-SRS_TR_MG (i.e., a (DIC format 4) the SRS request field of 2 bits) is received at a point of time SF#0 and an A-SRS_TR_MG (i.e., a (DIC format 4) the SRS request field of 2 bits) is received at a point of time SF#5, the final A-SRS_CL_SET and/or A-SRS_PR_SET may be determined based on Table 7 or Table 8.

TABLE 8

| VALUE OF SRS REQUEST FIELD | WHEN A-SRS_TR_MG IS RECEIVED ON SF(S) CORRESPONDING TO SF SET#0 | WHEN A-SRS_TR_MG IS RECEIVED ON SF(S) CORRESPONDING TO SF SET#1 |
|---|---|---|
| '00' | NO TYPE 1 SRS TRIGGER | NO TYPE 1 SRS TRIGGER |
| '01' | CELL#0 (and/or a previously configured SRS parameter set), CELL#6 (and/or a previously configured SRS parameter set) | CELL#1 (and/or a previously configured SRS parameter set), CELL#7 (and/or a previously configured SRS parameter set) |
| '10' | CELL#2 (and/or a previously configured SRS parameter set), CELL#8 (and/or a previously configured SRS parameter set) | CELL#3 (and/or a previously configured SRS parameter set), CELL#9 (and/or a previously configured SRS parameter set) |
| '11' | CELL#4 (and/or a previously configured SRS parameter set), CELL#10 (and/or a previously configured SRS parameter set) | CELL#5 (and/or a previously configured SRS parameter set), CELL#11 (and/or a previously configured SRS parameter set) |

In Table 8, it was assumed that bitmap information was signaled as '1010101010', for example. In this case, the bitmap information is information indicating whether each subframe has been allocated to which subframe set (SF set). In the bitmap information, the first location means subframe set allocation information about the first SF (i.e., SF#0). In this case, if the SF set allocation information of each SF is '1', it may mean that a corresponding SF is included in the SF set#0. If the SF set allocation information is '0', it may mean that a corresponding SF is included in the SF set#1. Accordingly, if the bitmap information is signaled as '1010101010', for example, the SF#0, SF#2, SF#4, SF#6 and SF#8 are included in the SF set#0 and the SF#1, SF#3, SF#5, SF#7 and SF#9 are included in the SF set#1.

TABLE 9

| VALUE OF SRS REQUEST FIELD | WHEN A-SRS_TR_MG IS RECEIVED ON SF(S) CORRESPONDING TO SF SET#0 | WHEN A-SRS_TR_MG IS RECEIVED ON SF(S) CORRESPONDING TO SF SET#1 |
|---|---|---|
| '00' | NO TYPE 1 SRS TRIGGER | NO TYPE 1 SRS TRIGGER |
| '01' | CELL#0 (and/or a previously configured SRS parameter set), CELL#1 (and/or a previously configured SRS parameter set), CELL#2 (and/or a previously configured SRS parameter set) (i.e., it may be construed that the A-SRS(s) of a cell(s) forming the CG#0 has been triggered) | CELL#6 (and/or a previously configured SRS parameter set), CELL#7 (and/or a previously configured SRS parameter set), CELL#8 (and/or a previously configured SRS parameter set) (i.e., it may be construed that the A-SRS(s) of a cell(s) forming the CG#2 has been triggered) |
| '10' | CELL#3 (and/or a previously configured SRS parameter set), CELL#4 (and/or a previously configured SRS parameter set), CELL#5 (and/or a previously configured SRS parameter set) (i.e., it may be construed that the A-SRS(s) of a cell(s) forming the CG#1 have been triggered) | CELL#9 (and/or a previously configured SRS parameter set), CELL#10 (and/or a previously configured SRS parameter set), CELL#11 (and/or a previously configured SRS parameter set) (i.e., it may be construed that the A-SRS(s) of a cell(s) forming the CG#3 have been triggered) |
| '11' | CELL#0 (and/or a previously configured SRS parameter set), CELL#1 (and/or a previously configured SRS parameter set), CELL#2 (and/or a previously configured SRS parameter set) CELL#3 (and/or a previously configured SRS parameter set), CELL#4 (and/or a previously configured SRS parameter set), CELL#5 (and/or a previously configured SRS parameter set) (i.e., it may be construed that the A-SRS(s) of a cell(s) forming the CG#1 and the CG#2 have been triggered) | CELL#6 (and/or a previously configured SRS parameter set), CELL#7 (and/or a previously configured SRS parameter set), CELL#8 (and/or a previously configured SRS parameter set) CELL#9 (and/or a previously configured SRS parameter set), CELL#10 (and/or a previously configured SRS parameter set), CELL#11 (and/or a previously configured SRS parameter set) (i.e., it may be construed that the A-SRS(s) of a cell(s) the CG#2 and the CG#3 have been triggered) |

In Table 9, it was assumed that the CG#0 included the CELL#0, CELL#1 and CELL#2, the CG#1 included the CELL#3, CELL#4 and CELL#5, the CG#2 included the CELL#6, CELL#7 and CELL#8, and the CG#3 included the CELL#9, CELL#10 and CELL#11.

In this case, an SRS parameter set for each cell corresponding to a specific (SRS request field) state may be independently (or differently) configured for each cell or may be independently (or differently) configured for each cell type or may be configured in common between previously configured (or signaled) cell(s) (i.e., a previously configured (or signaled) SRS parameter set may be applied in common). Furthermore, the SRS parameter set may be independently (or differently) configured for each CG or may be configured in common between some or all of the CGs. Furthermore, an SRS parameter set for each cell may be independently (or differently) configured between different (SRS request field) states or may be configured in common between different (SRS request field) states. Furthermore, an A-SRS_CL_SET (or A-SRS_CG_SET) and/or A-SRS_PR_SET information for each SF (set) may be independently (or differently) configured for each (UL) cell indicated (or scheduled) by an A-SRS_TR_MG (or for each (DL) cell in which the A-SRS_TR_MG has been received) or for each CG including an (UL) cell indicated (or scheduled) by an A-SRS_TR_MG (or for each CG including a (DL) cell in which an A-SRS_TR_MG has been received). Furthermore, a previously configured (or signaled) common A-SRS_CL_SET (or A-SRS_CG_SET) and/or A-SRS_PR_SET information for each SF (set) may be applied between CGs including an (UL) cell indicated (or scheduled) by an A-SRS_TR_MG (or a (DL) cell in which an A-SRS_TR_MG has been received) or an (UL) cell indicated (or scheduled) by an A-SRS_TR_MG (or CGs including a (DL) cell in which an A-SRS_TR_MG has been received). Furthermore, for example, a rule may be defined so that an A-SRS_CL_SET (or A-SRS_CG_SET) and/or A-SRS_PR_SET information for each SF (set) is independently (or differently) configured for each cell type (e.g., UCELL or LCELL). Furthermore, for example, an SF (set) in which an A-SRS_CL_SET (or A-SRS_CG_SET) and/or an A-SRS_PR_SET is configured may be construed as an SF (set) (or a point of time) in which an A-SRS_TR_MG is received or a corresponding A-SRS transmission SF (set) (or a point of time).

5) Example 5

In the aforementioned example (e.g., 1) example 1, 2) example 2, 3) example 3, and 4) example 4), if a cell(s) corresponding to a specific (SRS request field) state is some UCELL(s) on a CG including only a UCELL(s) (or it corresponds to only a UCELL(s) of a cell(s) forming a specific CG), a rule may be defined so that cell index (indices) information greater than the number of UCELL(s) in which a previously configured (or signaled) A-SRS is triggered (and/or SRS parameter set(s) information) and/or information about the number of UCELL(s) in which an A-SRS is triggered (hereinafter referred to as "K") are mapped to a corresponding specific (SRS request field) state or so that CG index (indices) information (and/or SRS parameter set(s) information) and/or information about the number of UCELL(s) in which an A-SRS is triggered are mapped to the corresponding specific (SRS request field) state. In this case, for example, K UCELL(s) in which the A-SRS is finally triggered may be defined so that the K number is selected in the descending power form (or ascending power form) of UCELL SERVCELLINDEX from among UCELL(s) whose CCA result is determined to be idle. For example, if a UCELL(s) which has a different CG index (indices) and whose CCA result is determined to be idle has the same SERVCELLINDEX(s), a rule may be defined so that a UCELL having a relatively low (or high) CG index is preferentially selected (or triggered). If this example is applied, the number of UCELL(s) in which an A-SRS is triggered (or the number of UCELL(s) in which A-SRS transmission is actually performed) may be maintained relatively constantly. Furthermore, for example, a rule may be defined so that cell index (indices) information greater than the number of UCELL(s) in which a previously configured (or signaled) A-SRS is triggered (and/or SRS parameter set(s) information) and/or information about the number of UCELL(s) in which an A-SRS is triggered or CG index (indices) information (and/or SRS parameter set(s) information) and/or information about the number of UCELL(s) in which an A-SRS is triggered, which are mapped to the aforementioned specific (SRS request field) state, are configured independently (or differently or in common) for each (UL) cell indicated (or scheduled) by an A-SRS_TR_MG (or for each (DL) cell in which the A-SRS_TR_MG has been received) or for each CG including an (UL) cell indicated (or scheduled) by an A-SRS_TR_MG (or for each CG including a (DL) cell in which an A-SRS_TR_MG has been received) or for each SF (set).

6) Example 6

If a massive CA mode is set or an (UL) cell(s) greater than a previously defined (or signaled) number have been configured, a rule may be defined so that a cell index (indices) (or a CG index (indices)) by which an A-SRS is triggered and/or SRS parameter set(s) information is mapped to a previously defined (or signaled) (SRS request field) state(s).

In this case, such information may be configured independently (or differently or in common) for each (UL) cell indicated (or scheduled) by an A-SRS_TR_MG (or for each (DL) cell in which the A-SRS_TR_MG has been received) or for each CG including an (UL) cell indicated (or scheduled) by an A-SRS_TR_MG (or for each CG including a (DL) cell in which an A-SRS_TR_MG has been received) or for each SF (set) or each cell type.

7) Example 7

In the case where a massive CA mode is set or an (UL) cell(s) greater than a previously defined (or signaled) number have been configured, if a plurality (hereinafter referred to as "NUM_TOX") of cell indices (or CG indices) and/or SRS parameter set(s) information is mapped (or signaled) to a previously defined (or signaled) (SRS request field) state#Z and the corresponding (SRS request field) state#Z is repeatedly indicated in different SF points of time, a rule may be defined so that the cell(s) (or CG(s)) of a previously defined (or signaled) number (hereinafter referred to as a "NUM_SEL") that has been subjected to circular selection from among NUM_TOX and/or or the SRS parameter set(s)-related A-SRS(s) is triggered.

In this case, for example, for convenience of description, a situation in which {a CELL#0 (and/or SRS parameter set#0), a CELL#1 (and/or SRS parameter set#1), a CELL#2 (and/or SRS parameter set#2), a CELL#3 (and/or SRS parameter set#3), a CELL#4 (and/or SRS parameter set#4), a CELL#5 (and/or SRS parameter set#5), and a CELL#6 (and/or SRS parameter set#6)} are mapped to an (SRS request field) state#Z and the value of NUM_SEL is set to 4 is assumed. In such a case, if the (SRS request field) state#Z is indicated at a point of time SF#A, an A-SRS(s) related to the CELL#0 (and/or the SRS parameter set#0), the CELL#1 (and/or the SRS parameter set#1), the CELL#2 (and/or the SRS parameter set#2) and the CELL#3 (and/or the SRS parameter set#3)-related are triggered/transmitted. Furthermore, if the (SRS request field) state#Z is (continuously) indicated at a point of time SF#B (A<B), an A-SRS(s) related to the CELL#4 (and/or the SRS parameter set#4), the CELL#5 (and/or the SRS parameter set#5), the CELL#6 (and/or the SRS parameter set#6) and the CELL#0 (and/or the SRS parameter set#0) are triggered/transmitted.

In this case, for example, it may be construed that such a circular selection operation a NUM_SEL cell(s) that belongs to a NUM_TOX cell(s) mapped to the (SRS request field) state#Z and that has a relatively low SERVCELLINDEX (or cell index) has been preferentially selected.

For another example, a rule may be defined so that in the circular selection operation, a NUM_SEL cell(s) (or LCELL(s) or UCELL(s)) that belongs to a NUM_TOX cell(s) mapped to the (SRS request field) state#Z and that has a relatively high (or low) SERVCELLINDEX (or cell index) (and/or a relatively high (or low) CG index) is preferentially selected.

In this case, as an additional example, a UCELL(s) in which an RRP has not been configured at a point of time at which A-SRS transmission is to be performed (or a point of time at which an A-SRS_TR_MG is received) may be set to have lower (higher) priority than a UCELL(s) (or LCELL(s)) in which an RRP has been configured at a point of time at which A-SRS transmission is to be performed (or a point of time at which the A-SRS_TR_MG is received).

For another example, a rule may be defined so that a previously defined (or signaled) (cell (or CG) index) offset (i.e., called an "IN_OFFSET") is applied between (continued) circular selection operations. For a detailed example, when an IN_OFFSET value is set to 2 in the aforementioned same example situation, if the (SRS request field) state#Z is indicated at a point of time SF#A, an A-SRS(s) related to the CELL#0 (and/or the SRS parameter set#0), the CELL#1 (and/or the SRS parameter set#1), the CELL#2 (and/or the SRS parameter set#2), and the CELL#3 (and/or the SRS parameter set#3) is triggered/transmitted. Furthermore, if the (SRS request field) state#Z is (continuously) indicated at a point of time SF#B (A<B), an A-SRS(s) related to the CELL#5 (and/or the SRS parameter set#5), the CELL#6 (and/or the SRS parameter set#6), the CELL#0 (and/or the SRS parameter set#0), and the CELL#1 (and/or the SRS parameter set#1)-related is triggered/transmitted. Furthermore, for example, a rule may be defined so that the NUM_TOX number of cell indices (or CG indices) and/or SRS parameter set(s) information and/or a NUM_SEL value related to a circular selection and/or an IN_OFFSET value related to a circular selection mapped to the (SRS request field) state#Z is independently (or differently or in common) set for each (UL) cell indicated (or scheduled) by an A-SRS_TR_MG (or for each (DL) cell in which the A-SRS_TR_MG has been received) or for each CG including an (UL) cell indicated (or scheduled) by an A-SRS_TR_MG (or for each CG including a (DL) cell in which an A-SRS_TR_MG has been received) or for each SF (set) or for each cell type.

Category 2

In the existing FDD system, the SRS request field was present on the DCI formats 0/4/1A. In the case of the existing TDD system, the SRS request field was present on the DCI formats 0/4/1A/2B/2C/2D. In this case, for example, the SRS request field of 2 bits was present in the case of the DCI format 4, and the SRS request field of 1 bit was present in the case of the remaining DCI formats 0/1A/2B/2C/2D.

When some or all of the following conditions are satisfied under a massive CA situation, a rule may be defined so that the SRS request field of 1 bit on the A-SRS_TR_MG is changed to the SRS request field of 2 bits.

In this case, for example, such a rule may be defined so that it is limitedly applied only when the A-SRS_TR_MG is transmitted on a UE-specific search space (USS). Furthermore, for example, the rule may be defined so that Category 2 is limitedly applied only when an (UL) cell(s) related to a CA greater than a previously defined (or signaled) number has been configured. Furthermore, for example, for efficient A-SRS triggering in a massive CA environment, if the SRS request field of 1 bit is additionally defined on a new (DL) DCI format, a rule may be defined so that Category 2 is limitedly applied to only the corresponding new DCI format. In this case, for example, the rule may be defined so that Category 2 is limitedly applied only when the corresponding new DCI format is transmitted on the USS. Furthermore, for example, the rule may be defined so that Category 2 is limitedly applied to only a TDD system (or TDD cell)-related (A-SRS triggering) DCI format (and/or an FDD system (or FDD CELL)-related (A-SRS triggering) DCI format).

Hereinafter, detailed conditions to which Category 2 is applied are as follows.

1) Condition 1

If an UL or DL or DL/UL cell(s) greater than a previously defined (or signaled) number has been configured according to a CA scheme, in this case, the previously defined (or signaled) number may be set to 5, for example. Furthermore, this condition may be construed as being that a massive CA mode has been set, for example.

2) Condition 2

If a CG(s) greater than a previously defined (or signaled) number is configured, in this case, the previously defined (or signaled) number may be set to 2, for example.

3) Condition 3

If the number of cell(s) forming a specific CG is greater than a previously defined (or signaled) value, in this case, the previously defined (or signaled) value may be set to 5, for example.

4) Condition 4

If a PUCCH format mode of a new type introduced for a massive CA environment is configured, in this case, the PUCCH format of a new type is a CA situation, for example, but may be construed as a PUCCH format (or a PUCCH format having a relatively great payload size compared to the existing one) introduced to support (or permit) PUCCH transmission on a previously defined (or signaled) SCELL.

The UE determines an SRS triggering target cell based on the aforementioned SRS triggering message (S1620). For example, at least one SRS triggering target cell may be determined based on a cell or cell group indicated by information indicative of a target cell that triggers an aperiodic SRS. That is, the UE determines an (UL) cell indicated (or scheduled) by an A-SRS_TR_MG received by the UE to be the SRS triggering target cell. Detailed contents of the (UL) cell indicated (or scheduled) by the A-SRS_TR_MG are the same as that described above.

Thereafter, the UE sends an SRS related to the determined cell to the network (S1630). More specifically, in the case of a massive CA environment, unlike in the existing CA environment, PUCCH transmission may be performed on a previously defined (or signaled) cell(s) in addition to a PCELL. In such a case, a probability that SRS transmission and PUCCH transmission may be generated at the same SF point of time is increased compared to the existing one. Accordingly, a probability that SRS transmission will be dropped is also increased compared to the existing one.

Accordingly, hereinafter, there are proposed methods for efficiently supporting SRS transmission under a massive CA environment. For example, categories proposed hereinafter may be defined so that they are limitedly applied only when an (UL) cell(s) related to a CA greater than a previously defined (or signaled) number has been configured. Furthermore, for example, the following proposed categories may be limitedly applied only when an MTAG is configured (and/or a power limited case)) (or an MTAG has not been configured).

Hereinafter, categories in which SRS transmission is efficiently supported under a massive CA environment are described in detail through Category 3 to Category 6.

Category 3

Although a massive CA mode is set or an (UL) cell(s) greater than a previously defined (or signaled) number has been configured, a UE may be configured to send an SRS when SRS transmission and PUCCH transmission that cause HARQ-ACK and/or a positive SR using a shortened format are generated at the same time in the same subframe.

In this case, such a rule may be defined so that it is limitedly applied if an MTAG has not been configured and/or if an MTAG has been configured (and/or a power limited case) and SRS transmission and PUCCH transmission are configured to be simultaneously performed at the same SF point of time on the same serving cell and/or if the simultaneous transmission of HARQ-ACK and an SRS has been set. Furthermore, in such a rule, the setting of a massive CA mode may be construed as being that the simultaneous transmission of HARQ-ACK and an SRS has been automatically set.

Category 4

If a massive CA mode is set or an (UL) cell(s) greater than a previously defined (or signaled) number has been configured, in the case of a 'non-power limited case', if SRS transmission and PUSCH transmission on different cell(s) are overlapped on the same symbol and/or if SRS transmission and PUCCH transmission based on a normal PUCCH format in which HARQ-ACK and/or positive SR information are carried on different cell(s) are overlapped at the same SF point of time, a rule may be defined so that SRS transmission is permitted.

In this case, for example, such a rule may be defined so that it is limitedly applied only when an MTAG has not been configured (or only when an MTAG is configured (and/or a power limited case)) or may be defined so that it is applied regardless of whether an MTAG has been configured or not. Furthermore, for example, a rule may be defined so that Category 4 is limitedly applied only when SRS transmission and PUSCH W/O UCI' (and/or PUSCH W/UCI') transmission on different cells are overlapped on the same symbol.

Furthermore, for example, a rule may be defined so that Category 4 is limitedly applied only when PUSCH transmission on a UCELL (and/or PUCCH transmission based on a normal PUCCH format in which HARQ-ACK and/or positive SR information are carried) is overlapped with SRS transmission on another cell (or UCELL or LCELL). In this case, for example, if PUSCH transmission on an LCELL (and/or a normal PUCCH format in which HARQ-ACK and/or positive SR information are carried) is overlapped with SRS transmission on another cell (or UCELL or LCELL), an existing rule may be configured (i.e., whether SRS transmission is to be dropped is determined depending on whether an MTAG has been configured or not) so that it is identically applied (or observed).

Category 5

Under an existing CA environment, if an MTAG has been configured and SRS transmission and PUSCH transmission are overlapped on the same symbol and/or if an MTAG has not been configured and SRS transmission and PUCCH transmission based on a normal PUCCH format in which HARQ-ACK and/or positive SR information are carried are overlapped on the same SF point of time, all of SRS transmission are dropped regardless of an SRS transmission number. However, if a massive CA mode is set or an (UL) cell(s) greater than a previously defined (or signaled) number has been configured, a rule may be defined so that whether an SRS is to be transmitted is finally determined according to the following example. In this case, for example, the following rules may be defined so that they are limitedly applied only when an MTAG is not configured (or only when an MTAG is configured (and/or a power limited case)) or may be defined so that they are applied regardless of whether an MTAG has been configured.

1) Example 1

For example, in the case where a plurality of SRS transmission and the transmission of a PUCCH in which periodic CSI (P-CSI) information is carried are overlapped at the same SF point of time, if the corresponding SRS transmission is a previously configured (or signaled) number or more, a rule may be defined so that the transmission of the PUCCH in which the P-CSI information is carried is dropped (or a symbol region related to the SRS transmission in the PUCCH in which the P-CSI information is carried is punctured (or rate-matched) and the (punctured (or rate-matched) PUCCH and/or) SRS transmission is performed). However, if the corresponding SRS transmission is smaller than the previously configured (or signaled) number, a rule may be defined so that (all of) the SRS transmission are dropped. For another example, if the number of transmissions of a PUCCH in which P-CSI information is carried is a previously configured (or signaled) number (e.g., 2) or more (or if the number of transmissions of a PUCCH on which P-CSI information is carried is greater than an SRS transmission number), a rule may be defined so that all of the SRS transmission are dropped.

2) Example 2

For example, in the case where a plurality of SRS transmission and PUSCH W/O UCI' (and/or PUSCH W/UCI') transmission are overlapped on the same symbol, if the corresponding SRS transmission is a previously configured (or signaled) number or more, a rule may be defined so that a symbol region related to the SRS transmission is punctured (or rate-matched) in the PUSCH W/O UCI' (and/or PUSCH W/UCI') and the (punctured (or rate-matched) PUSCH W/O UCI' (and/or PUSCH W/UCI') and/or) SRS transmission is performed. However, if the corresponding SRS transmission is smaller than the previously configured (or signaled) number, a rule may be defined so that the entire SRS transmission is dropped.

For another example, when a PUSCH W/O UCI' (and/or PUSCH W/UCI') transmission number is a previously configured (or signaled) number (e.g., 2) or more (or if the PUSCH W/O UCI' (and/or PUSCH W/UCI') transmission number is greater than an SRS transmission number), a rule may be defined so that the entire SRS transmission is dropped.

Category 6

Under the existing CA environment, if an MTAG has been configured and SRS transmission and PUCCH and/or PUSCH transmission are overlapped on different serving cells, and the total transmission power of a UE exceeds $P_{CMAX}$ (hereinafter referred to as a "power limited case"), the entire SRS transmission is dropped regardless of an SRS transmission number.

However, if a massive CA mode is set or an (UL) cell(s) greater than a previously defined (or signaled) number has been configured, a rule may be defined so that whether a shortened PUCCH format will be applied to a PUCCH transmitted on a PCELL and/or PSCELL and/or whether a symbol region related to SRS transmission (or the last symbol of a PUSCH) will be punctured (or rate-matched) in the PUSCH is finally determined depending on some or all of the following rules.

In this case, for example, frequency (or a probability) that a point of time at which SRS transmission is performed becomes the power limited case can be lowered by applying such a rule. Furthermore, for example, the following rules may be defined so that they are limitedly applied if an MTAG has not been configured (or if an MTAG has been configured (and/or the power limited case) or are applied regardless of whether an MTAG has been configured. Furthermore, for example, the following rules may be defined so that they are limitedly applied only when the simultaneous transmission of an HARQ-ACK ON PUCCH and an SRS is configured (or indicated) on a (PCELL and/or PSCELL (and/or a previously defined cell)-related) one subframe. Furthermore, for example, the following rules may be defined so that they are limitedly applied only when A-SRS transmission (or P-SRS transmission) is actually performed on a (PCELL and/or PSCELL (and/or a previously defined cell)-related) (UE-specific) A-SRS subframe (or a (UE-specific) P-SRS subframe or a previously configured (or signaled) subframe set).

1) Example 1

For example, if possible A-SRS transmission is reserved on at a PCELL and/or PSCELL (and/or previously defined cell)-related (UE-specific) A-SRS subframe point of time, in this case, for example, a rule may be defined so that a shortened PUCCH format is applied to a (PCELL and/or PSCELL) PUCCH transmitted at such a (UE-specific) A-SRS subframe point of time of a PCELL and/or PSCELL (and/or a previously defined (or signaled) cell) and/or may be defined so that a symbol region related to SRS transmission (or the last symbol of a PUSCH) is punctured (or rate-matched) to a (PCELL and/or PSCELL) PUSCH transmitted at such a (UE-specific) A-SRS subframe point of time of a PCELL and/or PSCELL (and/or previously defined (or signaled) cell).

2) Example 2

For example, if possible P-SRS transmission is reserved at a (UE-specific) P-SRS subframe point of time related to a PCELL and/or PSCELL (and/or a previously defined cell), in this case, for example, a rule may be defined so that a shortened PUCCH format is applied to a (PCELL and/or PSCELL) PUCCH at such a (UE-specific) P-SRS subframe point of time of a PCELL and/or PSCELL (and/or a previously defined (or signaled) cell) and/or a rule may be defined so that a symbol region related to SRS transmission (or the last symbol of a PUSCH) is punctured (or rate-matched) to a (PCELL and/or PSCELL) PUSCH transmitted at such a (UE-specific) P-SRS subframe point of time of a PCELL and/or PSCELL (and/or a previously defined (or signaled) cell).

3) Example 3

For example, a rule may be defined so that a shortened PUCCH format is applied to a (PCELL and/or PSCELL) PUCCH transmitted on a previously configured (or signaled) subframe set of a PCELL and/or PSCELL and/or a rule may be defined so that a symbol region related to SRS transmission (or the last symbol of a PUSCH) is punctured (or rate-matched) to a (PCELL and/or PSCELL) PUSCH at such a ((UE-specific) P-SRS or A-SRS) subframe of a PCELL and/or PSCELL.

In this case, for example, a corresponding subframe set may be defined as the union (or intersection) of cell-specific SRS subframes related to previously configured (or signaled) specific serving cells (or all of serving cells or all of CA-related serving cells) (or previously configured (or signaled) (specific) CG(s) or all of CG(s) or all of CG(s) related to a CA) or the union (or intersection) of UE-specific SRS subframes.

Hereinafter, 2. The method of coordinating SRS transmission power in a massive CA is described in detail through the drawing.

Figure 17:
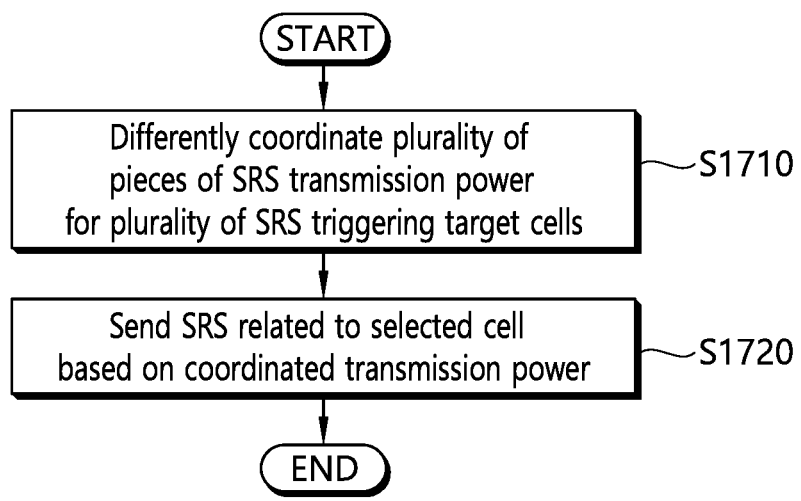
FIG. 17 is a flowchart of the method of coordinating SRS transmission power in a massive CA according to an embodiment of the present invention.

FIG. 17 is a flowchart of the method of coordinating SRS transmission power in a massive CA according to an embodiment of the present invention.

Referring to FIG. 17, a UE coordinates SRS transmission power with respect to an SRS triggering target cell (S1710). In the case of the existing CA environment, SRS transmission related to a plurality of cell(s) must be simultaneously performed at a specific point of time. If total transmission power of corresponding SRS transmission (hereinafter referred to as "TOTAL_SRS_SUMPW") exceeds $P_{CMAX}$, a UE scales down SRS transmission power for each cell to the (previously defined) same ratio until the TOTAL_SRS_SUMPW does not exceed $P_{CMAX}$ (according to a previously defined (existing) rule) and then performs SRS transmission for each cell based on the finally determined SRS transmission power.

However, in the case of a massive CA environment, for example, SRS transmission related to a large number of cell(s) may be overlapped at a specific point of time compared to the existing one. In this case, SRS transmission power for each cell(s) is excessively scaled down. Accordingly, there may be a problem in SRS-based UL CSI estimation performance (or a problem in the shortage of secured DL CSI information in addition to a problem in reduced UL CSI(s) estimation performance due to a channel reciprocity characteristic in the case of a TDD cell(s)).

Categories proposed hereinafter propose methods of effectively selecting a cell(s) whose SRS transmission is performed under a massive CA environment. In this case, for example, through the application of (some or all of) the proposed methods to be described later, pieces of transmission power of a plurality of SRSs (that need to be simultaneously performed at a specific point of time) are scaled down (at a previously set (or signaled) ratio). If the sum of the pieces of corresponding scaled-down SRS transmission power or each of the pieces of SRS transmission power is a (previously configured (or signaled)) specific level or more, all of the plurality of corresponding SRSs is simultaneously transmitted. If not (i.e., if the sum of the pieces of corresponding scaled-down SRS transmission power or each of the pieces of SRS transmission power is less than the (previously configured (or signaled)) specific level, only specific some SRSs (selected based on a previously defined rule) from the plurality of corresponding SRSs are transmitted, and the transmission of the remaining SRSs is dropped.

For example, a rule may be defined so that the following proposed methods are limitedly applied only when the TOTAL_SRS_SUMPW of SRSs that must be simultaneously transmitted at a specific point of time exceeds $P_{CMAX}$. Furthermore, for example, a rule may be defined so that the following proposed methods are limitedly applied only when an (UL) cell(s) related to a CA greater than a previously defined (or signaled) number are configured. Furthermore, for example, a rule may be defined so that the following proposed methods are limitedly applied if SRS transmission related to a TDD system (or TDD cell) must be simultaneously performed at a specific point of time (and/or if SRS transmission related to an FDD system (or TDD cell) must be simultaneously performed at a specific point of time). Furthermore, for example, a rule may be defined so that the following proposed methods are limitedly applied if an MTAG has been configured (and/or the power limited case) (and/or if SRS transmission related to a cell(s) belonging to a different TAG is overlapped and/or if SRS transmission related to a cell(s) belonging to the same TAG is overlapped) or if an MTAG has not been configured. Hereinafter, for convenience of description, for example, it is assumed that SRS transmission related to an N cell(s) must be simultaneously performed at an SF#M point of time. In this case, for example, it is assumed that the TOTAL_SRS_SUMPW of SRS transmission related to an N cell(s) exceeds $P_{CMAX}$. Hereinafter, more detailed contents of the present invention are described based on Category 7 to Category 8 below.

Category 7

If some or all of the following conditions are satisfied, a rule may be defined so that SRS transmission power for each cell is scaled down at a previously set (or signaled) ratio until TOTAL_SRS_SUMPW related to an N cell(s) does not exceed $P_{CMAX}$ and SRS transmission for each cell is performed based on the finally determined SRS transmission power.

That is, if some or all of the following conditions are satisfied, a rule may be defined so that a UE does not identically decrease SRS transmission power for each cell at a constant ratio, but the UE coordinates SRS transmission power for each cell at a different ratio.

In this case, for example, for convenience of description, the previously set (or signaled) ratio is called "WGT." Furthermore, for example, a rule may be defined so that a WGT value is differently (or independently) configured (or signaled) for each cell type (or for each CG). In this case, for example, a WGT value related to an LCELL(s) may be set higher than a WGT value related to a UCELL(s) (i.e., when SRS transmission power for each cell is scaled down, transmission power related to the UCELL is relatively much scaled down compared to the LCELL). Furthermore, for example, a rule may be defined so that the WGT value is independently (or differently) set (or signaled) for each cell or a rule may be defined so that the WGT value is set (or signaled) in common between the cells.

1) Condition 1

A case where after SRS transmission power for each cell is scaled down at a previously set (or signaled) ratio (WGT) until TOTAL_SRS_SUMPW related to an N cell(s) does not exceed $P_{CMAX}$, if the sum of pieces of corresponding scaled-down N SRS transmission power (hereinafter referred to as "TOT_SRS_SCSUMPW") is greater than or equal to (or greater than) the calculated value of a "(previously set (or signaled) scaling ratio threshold/100*$P_{CMAX}$)."

In this case, a rule may be defined so that the WGT value is differently (or independently) set (or signaled) for each cell type (or for each CG). For example, a WGT value related to an LCELL(s) may be set higher than a WGT value related to a UCELL(s) (i.e., when SRS transmission power for each cell is scaled down, transmission power related to the UCELL is relatively much scaled down compared to the LCELL). Furthermore, a rule may be defined so that the WGT value is independently (or differently) set (or signaled) for each cell or a rule may be defined so that the WGT value is set (or signaled) in common between the cells.

2) Condition 2

A case where after SRS transmission power for each cell is scaled down at a previously set (or signaled) ratio (WGT) until TOTAL_SRS_SUMPW related to an N cell(s) does not exceed $P_{CMAX}$, the scaled-down SRS power for each cell is greater than (all) or equal to (or greater than) the calculated value of a "(previously set (or signaled) scaling ratio threshold/100*$P_{CMAX}$)."

In this case, a rule may be defined so that a WGT value is differently (or independently) set (or signaled) for each cell type (or for each CG). For example, a WGT value related to an LCELL(s) may be set higher than a WGT value related to a UCELL(s) (i.e., when SRS transmission power for each cell is scaled down, transmission power related to the UCELL is relatively much scaled down compared to the LCELL). Furthermore, for example, a rule may be defined so that the WGT value is independently (or differently) set (or signaled) for each cell or a rule may be defined so that the WGT value is set (or signaled) in common between cells. Furthermore, a rule may be defined so that the scaling ratio threshold is independently (or differently) set (or signaled) for each cell (or for each cell type or CG) or a rule may be defined so that the WGT value is set (or signaled) in common between cells.

3) Condition 3

A case where SRS transmission power for each cell is scaled down at a previously set (or signaled) ratio (WGT) until TOTAL_SRS_SUMPW related to an N cell(s) does not exceed $P_{CMAX}$ and the scaled-down SRS power for each cell is greater than (all) or equal to (or greater than) the calculated value of the "(previously set (or signaled) scaling ratio threshold/100*$P_{CMAX,c}$)" of each cell (i.e., serving cell C).

In this case, a rule may be defined so that a WGT value is differently (or independently) set (or signaled) for each cell type (or for each CG). For example, a WGT value related to an LCELL(s) may be set higher than a WGT value related to a UCELL(s) (i.e., when SRS transmission power for each cell is scaled down, transmission power related to the UCELL is relatively much scaled down compared to the LCELL). Furthermore, for example, a rule may be defined so that the WGT value is independently (or differently) set (or signaled) for each cell or a rule may be defined so that the WGT value is set (or signaled) in common between the cells. Furthermore, for example, a rule may be defined so that the scaling ratio threshold is independently (or differently) set (or signaled) for each cell (or for each cell type or CG) or a rule may be defined so that the scaling ratio threshold is set (or signaled) in common between the cells.

For another example, there is a case where after SRS transmission power for each cell is scaled down at a previously set (or signaled) ratio until TOTAL_SRS_SUMPW related to an N cell(s) does not exceed $P_{CMAX}$, the scaling-down SRS power for each cell is greater than (all) or equal to (or greater than) the calculated value of the "(previously set (or signaled) scaling ratio threshold/100*(SRS power of a serving cell C before it is scaled-down (hereinafter referred to as "CON_SRSPW"))" of each cell (i.e., the serving cell C).

In this case, a rule may be defined so that the scaling ratio threshold is independently (or differently) set (or signaled) for each cell (or for each cell type or CG) or a rule may be defined so that the scaling ratio threshold is set (or signaled) in common between the cells.

For another example, a case where the sum of pieces of SRS transmission power related to an N cell(s) (CON_SRSPW) (prior to scaling-down) is greater than or equal to (or greater than or smaller than or equal to or smaller than) the calculated value (or previously set (or signaled) threshold value) of a "(previously set (or signaled) scaling ratio threshold/100*$P_{CMAX}$)."

In this case, a rule may be defined so that the (scaling ratio) threshold value is independently (or differently) set (or signaled) for each cell (or for each cell type or CG) or a rule may be defined so that the (scaling ratio) threshold value is set (or signaled) in common between the cells.

For another example, a case where each of pieces of SRS transmission power (CON_SRSPW) related to an N cell(s) (prior to scaling-down) is greater than (all) or equal to (or greater than or smaller than or equal to or smaller than) the calculated value (or previously set (or signaled) threshold value) of a "(previously set (or signaled) scaling ratio threshold/100*$P_{CMAX}$)."

In this case, a rule may be defined so that the (scaling ratio) threshold value is independently (or differently) set (or signaled) for each cell (or for each cell type or CG) or a rule may be defined so that the (scaling ratio) threshold value is set (or signaled) in common between the cells.

For another example, a case where after SRS transmission power for each cell is scaled down at a previously set (or signaled) ratio until TOTAL_SRS_SUMPW related to an N cell(s) does not exceed $P_{CMAX}$, TOT_SRS_SCSUMPW related to an N cell(s) is greater than or equal to (or greater than or smaller than or equal to or smaller than) the calculated value of a "(previously set (or signaled) scaling ratio threshold/100*TOTAL_SRS_SUMPW)."

In this case, a rule may be defined so that the scaling ratio threshold is independently (or differently) set (or signaled) for each cell (or for each cell type or CG) or a rule may be defined so that the scaling ratio threshold is set (or signaled) in common between the cells.

4) Condition 4

A case where after SRS transmission power for each cell is scaled down at a previously set (or signaled) ratio (WGT) until TOTAL_SRS_SUMPW related to an N cell(s) does not exceed $P_{CMAX}$, TOT_SRS_SCSUMPW related to the N cell(s) is greater than or equal to (or greater than) a previously set (or signaled) threshold value.

In this case, a rule may be defined so that the WGT value is differently (or independently) set (or signaled) for each cell type (or for each CG). For example, a WGT value related to an LCELL(s) may be set higher than a WGT value related to a UCELL(s). In this case, what the WGT value related to an LCELL(s) is set higher than the WGT value related to a UCELL(s) may mean that when SRS transmission power for each cell is scaled down, transmission power related to the UCELL is relatively much scaled down compared to the LCELL. Furthermore, for example, a rule may be defined so that the WGT value is independently (or differently) set (or signaled) for each cell or a rule may be defined so that the WGT value is set (or signaled) in common between the cells.

5) Condition 5

A case where after SRS transmission power for each cell is scaled down at a previously set (or signaled) ratio (WGT) until TOTAL_SRS_SUMPW related to an N cell(s) does not exceed $P_{CMAX}$, the scaled-down SRS power for each cell is greater than (all) or equal to (or greater than) a previously set (or signaled) threshold value (hereinafter referred to as "SC_THPW").

In this case, a rule may be defined so that the WGT value is differently (or independently) set (or signaled) for each cell type (or for each CG). For example, a WGT value related to an LCELL(s) may be set higher than a WGT value related to a UCELL(s). In this case, what the WGT value related to an LCELL(s) is set higher than the WGT value related to a UCELL(s) may mean that when SRS transmission power for each cell is scaled down, transmission power related to the UCELL is relatively much scaled down compared to the LCELL. Furthermore, for example, a rule may be defined so that the WGT value is independently (or differently) set (or signaled) for each cell or a rule may be defined so that the WGT value is set (or signaled) in common between the cells. Furthermore, for example, a rule may be defined so that the SC_THPW value is independently (or differently) set (or signaled) for each cell (or for each cell type or CG) or a rule may be defined so that the SC_THPW value is set (or signaled) in common between the cells.

If some or all of the conditions are satisfied, a configuration may be performed so that only SRS transmission that belongs to SRS transmission related to an N cell(s) and that is related to (N-K) cell(s) selected (or signaled) according to some or all of the following rules (or a cell(s) selected according to (some or all of) the following rules) is performed (i.e., SRS transmission related to K cell(s) is dropped).

In this case, for example, a rule may be defined so that it enables a UE to scale down SRS transmission power for each cell at a previously set (or signaled) ratio until TOTAL_SRS_SUMPW related to the corresponding (N-K) cell(s) does not exceed $P_{CMAX}$ and then perform SRS transmission for each cell based on the finally determined SRS transmission power. In this case, for example, a rule may be defined so that a WGT value is differently (or independently) set (or signaled) for each cell type (or for each CG). In this case, for example, a WGT value related to an LCELL(s) may be set higher than a WGT value related to a UCELL(s) (i.e., when SRS transmission power for each cell is scaled down, transmission power related to the UCELL is relatively much scaled down compared to the LCELL).

Furthermore, for example, a rule may be defined so that the WGT value is independently (or differently) set (or signaled) for each cell or a rule may be defined so that the WGT value is set (or signaled) in common between the cells.

For another example, in the case where an (UL) cell(s) related to a CA is set higher than a previously defined (or signaled) number (i.e., a Q (>N) cell(s) CA situation), if SRSs related to an N cell(s) must be simultaneously transmitted, if PUSCH (/PUCCH/PRACH) transmissions must be performed on a cell(s) of a different (Q-N) number (or a number smaller than (Q-N), the power limited case) and/or if a massive CA mode is set, unlike in the 'existing', if a cell(s) related to (minimum) K SRS transmission that simultaneously satisfies some (or all of) the aforementioned conditions 1) Condition 1, 2) Condition 2, 3) Condition 3, 4) Condition 4, 5) Condition 5 and the condition in which the total transmission power of a UE does not exceed $P_{CMAX}$ are selected (i.e., SRS transmission is dropped) according 1) Example 1 and 2) Example 2 below and if pieces of SRS transmission power related to a corresponding K cell(s) are distributed to pieces of SRS transmission power related to the remaining (N-K) cell(s), a rule may be defined so that SRS transmission related to an (N-K) cell(s) is performed even in the corresponding situation. In this case, the aforementioned 'existing' means that if an MTAG has been configured, SRS transmission and PUCCH and/or PUSCH and/or PRACH transmission are overlapped on different serving cells, and the total transmission power of a UE exceeds $P_{CMAX}$ (the power limited case), (all of pieces of) SRS transmission are dropped regardless of an SRS transmission number.

In this case, for example, such a rule may be defined so that it is limitedly applied if the number of SRSs simultaneously transmitted is a previously set (or signaled) threshold value or more (or less than the previously set (or signaled) threshold value) and/or if SRS transmission related to a plurality of cells is overlapped with the transmission(s) of a PUCCH in which P-CSI information is carried on different cells (and/or if they are overlapped with PUSCH W/O UCI transmission(s) on different cells) and/or if SRS transmission related to a plurality of cell(s) (the pieces of the transmission of a PUCCH (on which P-CSI information is carried) on different cells overlapped (on the time resources region) (and/or pieces of PUSCH (W/O UCI or W/UCI) transmission on different cells) is smaller than a previously set (or signaled) threshold value (or more) and/or if an MTAG has been configured (and/or if an MTAG has not been configured) and/or in the case of the power limited case.

For another example, in the case where an (UL) cell(s) related to a CA is much more configured than a previously defined (or signaled) number (i.e., a Q (>N) cell(s) CA situation, if SRSs related to an N cell(s) must be simultaneously transmitted, if PUSCH (/PUCCH/PRACH) transmissions must be performed on a different (Q-N) number (or a number smaller than (Q-N)) of cells, the power limited case) and/or if a massive CA mode is set, unlike in "the existing", if a cell(s) related to (minimum) K SRS transmission that satisfies the condition in which the (not-scaled-down) total transmission power of a UE does not exceed $P_{CMAX}$ is selected (i.e., SRS transmission is dropped) according to 1) Example 1 and/or 2) Example 2 below and pieces of SRS transmission power related to a corresponding K cell(s) are distributed to pieces of SRS transmission power related to the remaining (N-K) cell(s), a rule may be defined so that SRS transmission related to an (N-K) cell(s) is performed even in the corresponding situation. In this case, the "existing" may mean that (all of pieces of) SRS transmission are dropped regardless of an SRS transmission number if an MTAG has been configured and if SRS transmission and PUCCH and/or PUSCH and/or PRACH transmission are overlapped on different serving cells and if the total transmission power of a UE exceeds $P_{CMAX}$ (the power limited case).

In this case, for example, such a rule may be defined so that it is limitedly applied if the number of SRSs simultaneously transmitted is a previously set (or signaled) threshold value or more (or less than the previously set (or signaled) threshold value and/or if SRS transmission related to a plurality of cells is overlapped with the transmission(s) of a PUCCH on which P-CSI information on different cells is carried (and/or if they are overlapped with PUSCH W/O UCI transmission(s) on different cells) and/or if SRS transmission related to a plurality of cells and the transmission(s) of a PUCCH (on which P-CSI information is carried) on different cells overlapped (on the time resources region) (and/or PUSCH (W/O UCI or W/UCI) transmission(s) on different cells) is smaller than (or equal to or more than) a previously set (or signaled) threshold value and/or if an MTAG has been configured (and/or if an MTAG has not been configured) and/or in the case of the power limited case.

1) Rule 1

If Condition 1 is applied, the K value may be determined to be any one of (minimum) values in which TOT_SRS_SCSUMPW related to an (N-K) cell(s) may be greater than or equal to (or greater than) the calculated value of a "(previously set (or signaled) scaling ratio threshold/100*PCMAX)", Alternatively, if Condition 2 is applied, the K value may be determined to be any one of (minimum) values in which scaled-down SRS power for each cell related to an (N-K) cell(s) may be greater than or equal to (or greater than) (all) the calculated value of a "(previously set (or signaled) scaling ratio threshold/100*$P_{CMAX}$)", Alternatively, if Condition 3 is applied, the K value may be determined to be any one of (minimum) values in which scaled-down SRS power for each cell related to an (N-K) cell(s) may be greater than or equal to (or greater than) (all) the calculated value of a "(previously set (or signaled) scaling ratio threshold/100*$P_{CMAX,c}$)", Alternatively, if Condition 3 is applied, the K value may be determined to be any one of (minimum) values in which scaled-down SRS power for each cell related to an (N-K) cell(s) may be greater than or equal to (or greater than) (all) the calculated value of a "(previously set (or signaled) scaling ratio threshold/100*(SRS power of a serving cell C prior to scaling-down)" of each cell (i.e., the serving cell C), Alternatively, if Condition 3 is applied, the K value may be determined to be any one of (minimum) values in which the sum of SRS transmission power related to an (N-K) cell(s) (prior to scaling-down) may be greater than or equal to (or greater than or smaller than or equal to or smaller than) of the calculated value (or previously set (or signaled) threshold value) of a "(previously set (or signaled) scaling ratio threshold/100*$P_{CMAX}$)", Alternatively, if Condition 3 is applied, the K value may be determined to be any one of (minimum) values in which each of pieces of SRS transmission power related to an (N-K) cell(s) (prior to scaling-down) may be greater than (all) or equal to (or greater than or smaller than or equal to or smaller than) the calculated value (or previously set (or signaled) threshold value) of a "(previously set (or signaled) scaling ratio threshold/100*$P_{CMAX}$)", Alternatively, if Condition 3 is applied, the K value may be determined to be any one of (minimum) values in which TOT_SRS_SCSUMPW related to an (N-K) cell(s) may be greater than or equal to (or greater than or smaller than or equal to or smaller than) the calculated value of a "(previously set (or signaled) scaling ratio threshold/100* TOTAL_SRS_SUMPW)", Alternatively, if Condition 4 is applied, the K value may be determined to be any one of (minimum) values in which TOT_SRS_SCSUMPW related to an (N-K) cell(s) may be greater than or equal to (or greater than) a previously set (or signaled) threshold value or (if (Condition#3-5) is applied) the K value may be determined to be any one of (minimum) values in which scaled-down SRS power for each cell related to an (N-K) cell(s) may be greater than or equal to (or greater than) (all) a previously set (or signaled) SC_THPW value. An (N-K) cell(s) whose SRS transmission is performed and/or a K cell(s) whose SRS transmission are dropped may be finally selected depending on (some or all of) the following rules.

a) Example 1

A rule may be defined so that a UCELL(s) is selected from a UCELL having the highest SERVCELLINDEX [3] (in terms of the SERVCELLINDEX(SERVCELLINDICES) of the UCELL(s)) in a descending power form (or the UCELL(s) is selected from a UCELL having the lowest SERVCELLINDEX (in terms of the SERVCELLINDEX (SERVCELLINDICES) of the UCELL(s)) in an ascending power form) and SRS transmission is dropped.

In this case, a rule may be defined so that a CCA result of a corresponding UCELL(s) is determined to be idle and thus the corresponding UCELL(s) is limited to only a UCELL(s) whose SRS transmission may be performed or a rule may be defined so that the corresponding UCELL(s) is considered as a UCELL(s) whose SRS transmission has been scheduled (or triggered) regardless of the CAA result. If such a rule is defined, for example, SRS transmission related to a UCELL may be construed as having lower importance (or priority) than SRS transmission related to an LCELL. For another example, a rule may be defined so that a cell(s) is selected from a cell having the highest SERVCELLINDEX [3] (in terms of the SERVCELLINDEX(SERVCELLINDICES) of the cell(s)) in a descending power form (or the cell(s) is selected from a cell having the lowest SERVCELLINDEX (in terms of the SERVCELLINDEX(SERVCELLINDICES) of the cell(s)) in an ascending power form) and SRS transmission is dropped. For another example, a rule may be defined so that an LCELL(s) is selected from an LCELL having the highest SERVCELLINDEX [3] (in terms of the SERVCELLINDEX(SERVCELLINDICES) of the LCELL(s)) in a descending power form (or the LCELL(s) is selected from an LCELL having the lowest SERVCELLINDEX (in terms of the SERVCELLINDEX(SERVCELLINDICES) of the LCELL(s)) in an ascending power form) and SRS transmission is dropped.

b) Example 2

A rule may be defined so that a UCELL(s) is selected from a UCELL(s) having the highest CG index (in terms of a CG index(indices)) in a descending power form (or selected from a UCELL(s) having the lowest CG index (in terms of a CG index(indices)) in an ascending power form and SRS transmission is dropped.

In this case, for example, a rule may be defined so that a UCELL whose SRS transmission is dropped is selected according to Example 1 between UCELLs having the same CG index or a rule may be defined so that a UCELL whose SRS transmission is dropped is randomly selected between UCELLs having the same CG index. Furthermore, for example, a rule may be defined so that a CCA result of a corresponding UCELL(s) is determined to be idle and thus the corresponding UCELL(s) is limited to only a UCELL(s) whose SRS transmission may be performed or a rule may be defined so that a corresponding UCELL(s) is considered as a UCELL(s) whose SRS transmission has been scheduled (or triggered) regardless of the CAA result. For another example, a rule may be defined so that a cell(s) is selected from a cell(s) having the highest CG index (in terms of a CG index(indices)) in a descending power form (or the cell(s) is selected from a cell(s) having the lowest CG index (in terms of a CG index(indices)) in an ascending power form) and SRS transmission is dropped. In this case, for example, a rule may be defined so that a cell(s) having the same CG index is selected from a cell having the highest SERVCELLINDEX [3] (in terms of the SERVCELLINDEX(SERVCELLINDICES) of the cell(s)) in a descending power form (or the cell(s) having the same CG index is selected from a cell having the lowest SERVCELLINDEX (in terms of the SERVCELLINDEX(SERVCELLINDICES) of the cell(s)) in an ascending power form) between the cell(s) having the same CG index and a cell whose SRS transmission is dropped is selected or a rule may be defined so that a cell whose SRS transmission is dropped is randomly selected between the cell(s) having the same CG index. For another example, a rule may be defined so that an LCELL(s) is selected from an LCELL(s) having the highest CG index (in terms of a CG index(indices)) in a descending power form (or the LCELL(s) is selected from an LCELL(s) having the lowest CG index (in terms of a CG index(indices)) in an ascending power form) and SRS transmission is dropped. In this case, for example, a rule may be defined so that an LCELL(s) having the same CG index is selected from an LCELL having the highest SERVCELLINDEX [3] (in terms of the SERVCELLINDEX(SERVCELLINDICES) of the LCELL(s)) in a descending power form (or the LCELL(s) having the same CG index is selected from an LCELL having the lowest SERVCELLINDEX (in terms of the SERVCELLINDEX(SERVCELLINDICES) of the LCELL(s)) in an ascending power form) and an LCELL whose SRS transmission is dropped is selected or a rule may be defined so that an LCELL whose SRS transmission is dropped is randomly selected between the LCELL(s) having the same CG index.

c) Example 3

If a) Example 1 and/or b) Example 2 is applied, a rule may be defined so that a UCELL(s) in which an RRP has not been configured (and/or a UCELL(s) whose CCA result is determined to be busy and whose SRS transmission cannot be performed) at a point of time at which A-SRS transmission is to be performed (or a point of time at which an A-SRS_TR_MG is received) is determined to have higher (or lower) priority than a UCELL(s) in which RRP has been configured at a point of time at which A-SRS transmission is to be performed (or a point of time at which an A-SR-S_TR_MG is received) (and/or a UCELL(s) whose CCA result is determined to be idle and whose SRS transmission can be performed) (or LCELL(s)) and SRS transmission is dropped.

2) Rule 2

A rule may be defined so that only SRS transmission related to a previously defined (or signaled) number (i.e., (N-K)) of a cell(s) is performed.

In this case, the corresponding previously defined (or signaled) number (i.e., (N-K)) may be set to 5. Furthermore, for example, regarding the (N-K) cell(s) of N cell(s), a rule may be defined so that an LCELL(s) is selected from an LCELL having the highest SERVCELLINDEX [3] (in terms of the SERVCELLINDEX(SERVCELLINDICES) of the LCELL(s)) in a descending power form (or the LCELL(s) are selected from an LCELL having the lowest SERVCELLINDEX (in terms of the SERVCELLINDEX(SERVCELLINDICES) of the LCELL(s)) in an ascending power form) (i.e., in selecting a cell(s) whose SRS transmission is performed, an LCELL(s) may be construed as having higher priority than a UCELL(s)) or a rule may be defined so that a cell(s) (or UCELL(s)) is selected from a cell having the highest SERVCELLINDEX [3] (or UCELL) (in terms of the SERVCELLINDEX(SERVCELLINDICES) of the cell(s) (or UCELL(s)) in a descending power form (or the cell(s) (or UCELL(s)) is selected from a cell having the lowest SERVCELLINDEX (or UCELL) (in terms of the SERVCELLINDEX(SERVCELLINDICES) of the cell(s) (or UCELL(s)) in an ascending power form). In this case, for example, a rule may be defined so that if the selection of (N-K) cell(s) of the LCELL(s) (or UCELL(s)) cannot be completed because (the number of LCELL(s) (or UCELL(s)) is selected less than (N-K)), regarding the remaining cell(s), the UCELL(s) (or LCELL(s)) is selected from a UCELL (or LCELL) having the highest SERVCELLINDEX [3] (in terms of the SERVCELLINDEX(SERVCELLINDICES) of the UCELL(s) (or LCELL(s)) in a descending power form (or the UCELL(s) (or LCELL(s)) is selected from a UCELL (or LCELL) having the lowest SERVCELLINDEX (in terms of the SERVCELLINDEX(SERVCELLINDICES) of the UCELL(s) (or LCELL(s)) in an ascending power form). For another example, regarding the (N-K) cell(s) of N cell(s), a rule may be defined so that an LCELL(s) is selected from an LCELL(s) having the highest CG index (in terms of a CG index(indices)) in a descending power form (or the LCELL(s) is selected from an LCELL(s) having the lowest CG index (in terms of a CG index(indices)) in an ascending power form), a rule may be defined so that or a cell(s) is selected from a cell(s) having the highest CG index (in terms of a CG index(indices)) in a descending power form (or the cell(s) is selected from a cell(s) having the lowest CG index (in terms of a CG index(indices)) in an ascending power form) or a rule may be defined so that a UCELL(s) is selected from a UCELL(s) having the highest CG index (in terms of a CG index(indices)) in a descending power form (or from a UCELL(s) having the lowest CG index (in terms of a CG index(indices)) in an ascending power form). In this case, for example, a rule may be defined so that an LCELL(s) (or a cell(s) or UCELL(s)) having the same CG index is randomly selected or a rule may be defined so that an LCELL(s) (or a cell(s) or UCELL(s)) is selected from an LCELL (or a cell or UCELL(s)) having the highest SERVCELLINDEX [3] (in terms of the SERVCELLINDEX (SERVCELLINDICES) of the LCELL(s) (or the cell(s) or UCELL(s)) in a descending power form (or the LCELL(s) (or cell(s) or UCELL(s)) is selected from an LCELL (or a cell (or UCELL(s)) having the lowest SERVCELLINDEX (in terms of the SERVCELLINDEX(SERVCELLINDICES) of the LCELL(s) (or the cell(s) or UCELL(s)) in an ascending power form).

For another example, a rule may be defined so that only SRS transmission related to a previously designated (or signaled) cell(s) (or LCELL(s) or UCELL(s)) is performed. In this case, for example, the number of previously designated (or signaled) cell(s) becomes (N-K). For another example, if 2) Rule 2 is applied, a rule may be defined so that a UCELL(s) in which an RRP has not been configured (and/or a UCELL(s) whose CCA result is determined to be busy and whose SRS transmission cannot be performed) at a point of time at which A-SRS transmission is to be performed (or a point of time at which an A-SRS_TR_MG is received) is selected with priority lower (or higher) than a UCELL(s) in which an RRP has been configured at a point of time at which A-SRS transmission is to be performed (or a point of time at which an A-SRS_TR_MG is received) (and/or a UCELL(s) (or LCELL(s)) whose CCA result is determined to be idle and whose SRS transmission can be performed).

3) Rule 3

A rule may be defined so that only SRS transmission related to an LCELL(s) of an N cell(s) is performed (i.e., SRS transmission related to a UCELL(s) is dropped).

For example, a rule may be defined so that SRS transmission related to a UCELL(s) of N cell(s) is performed (i.e., SRS transmission related to an LCELL(s) is dropped).

4) Rule 4

A rule may be defined so that only SRS transmission related to a cell(s) that belongs to an N cell(s) and whose PUCCH transmission has been configured (or permitted) (i.e., SRS transmission related to a cell(s) whose PUCCH transmission is not performed is dropped).

5) Rule 5

A rule may be defined so that only SRS transmission related to a cell(s) forming a previously defined (or signaled) number (i.e., called "U") of CG(s) is performed.

In this case, the number of previously designated (or signaled) CG(s) may be set to 2. For convenience of description, for example, it is assumed that a total T CG(s) has been configured. For example, a rule may be defined so that an U CG(s) of the T CG(s) is selected from a CG having the highest CG index (in terms of a CG index(indices)) in a descending power form (or the U CG(s) is selected from a CG having the lowest CG index (in terms of a CG index (indices)) in an ascending power form) or a rule may be defined so that the U CG(s) is preferentially selected from a CG having a higher portion of an LCELL(s) (or a UCELL(s)). In this case, for example, if the latter rule is applied, a rule may be defined so that a CG(s) having the same portion of an LCELL(s) (or UCELL(s)) is randomly selected or the CG(s) having the same portion of an LCELL(s) (or UCELL(s)) is selected from a CG having a relatively high CG index (in terms of a CG index(indices)) in a descending power form (or the CG(s) having the same portion of an LCELL(s) (or UCELL(s)) is selected from a CG having a relatively low CG index (in terms of a CG index(indices)) in an ascending power form).

For another example, a rule may be defined so that only SRS transmission related to a cell(s) (or LCELL(s) or UCELL(s)) forming a previously designated (or signaled) CG(s) (or a CG(s) including only an LCELL(s) or a CG(s) including only a UCELL(s)) is performed.

6) Rule 6

A rule may be defined so that only SRS transmission related to a cell(s) forming a CG(s) including an LCELL(s) only is performed. For another example, a rule may be defined so that only SRS transmission related to a cell(s) forming a CG(s) including only a UCELL(s) is performed.

7) Rule 7

A rule may be defined so that only SRS transmission related to a cell(s) (or LCELL(s) or UCELL(s)) forming a CG(s) including a previously defined (or signaled) cell(s) is performed. In this case, for example, the previously defined (or signaled) cell(s) may be configured as a cell(s) in which PCELL (or primary SCELL (PSCELL) or PUCCH transmission has been configured (or permitted).

8) Rule 8

A rule may be defined so that only A-SRS (or P-SRS) transmission related to an LCELL(s) (or a cell(s) or UCELL(s)) is performed. In this case, for example, it may be construed that if such a rule is applied, A-SRS (or P-SRS) transmission related to an LCELL(s) (or a cell(s) or UCELL(s)) has higher priority than P-SRS (or A-SRS) transmission.

9) Rule 9

A rule may be defined so that if TOTAL_SRS_SUMPW of SRS transmission related to an N cell(s) exceeds $P_{CMAX}$, but total transmission power of SRS transmission related to an LCELL(s) (or UCELL(s)) does not exceed $P_{CMAX}$, SRS transmission related to the remaining UCELL(s) (or LCELL(s)) is dropped. In this case, for example, a rule may be defined so that in order to reallocate extra power generated due to the dropping of the SRS transmission related to the UCELL(s) (or LCELL(s)) as SRS transmission related to an LCELL(s) (or UCELL(s)), SRS transmission power for each LCELL(s) (or UCELL(s)) is increased at a previously set (or signaled) ratio within the range in which total transmission power of the SRS transmission related to the LCELL(s) (or UCELL(s)) does not exceed $P_{CMAX}$. For another example, a rule may be defined so that if TOTAL_SRS_SUMPW of SRS transmission related to an N cell(s) exceeds $P_{CMAX}$, but total transmission power of SRS transmission related to an LCELL(s) (or UCELL(s)) does not exceed $P_{CMAX}$, only SRS transmission power for each UCELL (or LCELL) is scaled down at a previously set (or signaled) ratio until TOTAL_SRS_SUMPW related to a (total) N cell(s) does not exceed $P_{CMAX}$.

10) Rule 10

A rule may be defined so that an (N-K) cell(s) whose SRS transmission is performed and/or a K cell(s) whose SRS transmission is dropped, from among pieces of SRS transmission related to N cell(s), are selected by a combination of some (or all of) the aforementioned rules (e.g., 1) Rule 1 to 2) Rule 2. For a detailed example, a rule may be defined so that an (N-K) cell(s) whose SRS transmission is performed (and/or K cell(s) whose SRS transmission is dropped) is selected in the priority form of 'A-SRS>P-SRS WITH LOWER SERVCELLINDEX>P-SRS WITH HIGHER SERVCELLINDEX'. In this case, for example, 'A>B' indicates that A has higher (or lower) priority than B when a cell(s) whose SRS transmission is performed is selected (or B has higher (or lower) priority than A when a cell(s) whose SRS transmission is dropped is selected). For another example, a rule may be defined so that (N-K) cell(s) whose SRS transmission is performed (and/or K cell(s) whose SRS transmission is dropped) is selected in the form of 'A-SRS>P-SRS ON LCELL>P-SRS ON UCELL'.

Category 8

A rule may be defined so that the operation of scaling down pieces of SRS transmission power at a previously set (or signaled) ratio (WGT) until TOTAL_SRS_SUMPW does not exceed $P_{CMAX}$ in Category 7 is performed in a 'per cell' unit or a rule may be defined so that the operation is performed in a 'per SRS antenna port' unit. In this case, for example, a rule may be defined so that the WGT value is independently (or differently) set (or signaled) for each cell (or for each SRS antenna port or cell type or CG) or a rule may be defined so that the WGT value is set (or signaled) in common between cells (or SRS antenna ports or cell types or CGs).

As a detailed example of the former case, the WGT value of an LCELL(s) (or an SRS antenna port(s) related to the LCELL(s)) may be set higher than that of a UCELL(s) (or an SRS antenna port(s) related to a UCELL(s)). Furthermore, for example, in the aforementioned proposed methods (e.g., Category 1 to Category 2 and Category 7), the term 'pieces of SRS transmission related to an N cell(s)' may be construed as being N SRS transmission performed through an N (SRS) port(s) on a cell(s) smaller than N. Furthermore, for example, in the aforementioned proposed methods (e.g., Category 1 to Category 2 and Category 7), each SRS may be considered (or construed) as being a 'per cell' or 'per SRS antenna port' unit (in terms of the number).

For another example, a rule may be defined so that if an (UL) cell(s) related to a CA has been configured to be greater than a previously defined (or signaled) number (i.e., a Q (>N) cell(s) CA situation, if SRSs related to an N cell(s) need to be simultaneously transmitted, a power limited case) and/or if a massive CA mode is set, if SRS transmission related to the existing (i.e., a plurality of cell(s)) must be simultaneously performed at a specific point of time, and if the (not-scaled-down) total transmission power (i.e., called "TOTAL_SRS_SUMPW") of corresponding SRS transmission exceeds $P_{CMAX}$, a UE scales down SRS transmission power for each cell at a (previously defined) same ratio until TOTAL_SRS_SUMPW does not exceed $P_{CMAX}$ (according to a previously defined (existing) rule), a (minimum) K cell(s) related to SRS transmission that satisfies the condition in which the (not-scaled-down) total transmission power of the UE does not exceed $P_{CMAX}$ is selected (i.e., SRS transmission is dropped) according to a) Example 1 to b) Example 2 of Category 7 unlike in the execution of SRS transmission for each cell based on the finally determined SRS transmission power, and pieces of SRS transmission power of a corresponding K cell(s) are distributed as pieces of SRS transmission power related to the remaining (N-K) cell(s), SRS transmission related to the (N-K) cell(s) is performed even in the corresponding situation. In this case, for example, such a rule may be defined so that it is limitedly applied if the number of SRSs simultaneously transmitted is a previously set (or signaled) threshold value or more (or less than the previously set (or signaled) threshold value) and/or if an MTAG has been configured (and/or if an MTAG has not been configured) and/or in the case of the power limited case.

Thereafter, the UE sends an SRS related to the selected cell based on the determined SRS transmission power (S1720). In this case, detailed contents of the determination of the SRS transmission power is the same as that described above.

In the present invention, for convenience of description, as described above, 1. The method for performing SRS triggering through an SRS triggering message in a massive CA has been described through Category 1 to Category 6 and 2. The method for coordinating SRS transmission power in a massive CA has been described through Category 7 to Category 8. However, in such a description, embodiments have been merely randomly separated and described in order for the present invention to be easily understood, and the aforementioned categories may be complexly applied. For example, in a massive CA, when SRS transmission power is coordinated, Category 1 to Category 6 may be applied. In a massive CA, when an SRS is triggered through an SRS triggering message, Category 7 to Category 8 may be applied.

That is, the examples of the aforementioned proposed methods may be included as implementation methods of the present invention and thus it is evident that the examples may be considered to be a kind of proposed methods. Furthermore, the aforementioned proposed methods may be independently implemented, but may be implemented in the form of a combination (merge) of some of the proposed methods. Furthermore, for example, a rule may be defined so that the aforementioned proposed methods are limitedly applied to a CG having a previously defined (or signaled) specific cell type (e.g., UCELL or LCELL) and/or a specific cell type (e.g., UCELL or LCELL). Furthermore, for example, a rule may be defined so that the aforementioned proposed methods are applied differently (or independently) for each cell type and/or CG (and/or cell). Furthermore, for example, a rule may be defined so that the aforementioned proposed methods are limitedly applied upon performing the A-SRS transmission (and/or P-SRS transmission). Furthermore, for example, a rule may be defined so that the aforementioned proposed methods are limitedly applied if an MTAG has been configured (and/or the power limited case) (and/or if an MTAG has not been configured). Furthermore, for example, a rule may be defined so that the aforementioned proposed methods are limitedly applied only in the power limited case (and/or a non-power limited case). Furthermore, for example, a rule may be defined so that the aforementioned proposed methods are limitedly applied only when an A-SRS_TR_MG is transmitted on a USS (and/or CSS). Furthermore, for example, a rule may be defined so that the aforementioned proposed methods are limitedly applied if a massive CA mode is set and/or if an (UL) cell(s) (or an (UL) LCELL(s) or (UL) UCELL(s) or (UL) LCELL(s)/UCELL(s)) has been set as a previously defined (or signaled) number or more (or if a configured (UL) cell(s) (or a configured (UL) LCELL(s) or configured (UL) UCELL(s) or configured (UL) LCELL(s)/UCELL(s)) is set as a previously defined (or signaled) number or more) and/or if an activated (UL) cell(s) (or an activated (UL) LCELL(s) or activated (UL) UCELL(s) or activated (UL) LCELL(s)/UCELL(s)) is set as a previously defined (or signaled) number or more. In this case, for example, a rule may be defined so that the existing (REL-12 LTE) operation is applied if a massive CA mode has not been configured and/or if an (UL) cell(s) (or an (UL) LCELL(s) or (UL) UCELL(s) or (UL) LCELL(s)/UCELL(s)) has been set less than a previously defined (or signaled) number (or if a configured (UL) cell(s) (or a configured (UL) LCELL(s) or configured (UL) UCELL(s) or configured (UL) LCELL(s)/UCELL(s)) has been set less than a previously defined (or signaled) number) and/or if an activated (UL) cell(s) (or an activated (UL) LCELL(s) or activated (UL) UCELL(s) or activated (UL) LCELL(s)/UCELL(s)) has been set less than a previously defined (or signaled) number. Furthermore, for example, rule may be defined so that the aforementioned proposed methods (e.g., Category 7 and Category 8) are extended and applied if a plurality of (or a previously defined (or signaled) number or more) of pieces of SRS transmission is overlapped and if a plurality of (or a previously defined (or signaled) number or more) pieces of PUSCH transmission is overlapped and/or if a plurality of (or a previously defined (or signaled) number or more) of pieces of PUCCH transmission is overlapped and/or if a plurality of (or a previously defined (or signaled) number or more) of pieces of PRACH transmission is overlapped.

That is, the aforementioned SRS transmission process in a massive CA (1. the method for performing SRS triggering through an SRS triggering message in a massive CA and 2. the method for coordinating SRS transmission power in a massive CA) may be merged as follows, and detailed contents thereof are descried through the following drawing.

Figure 18:
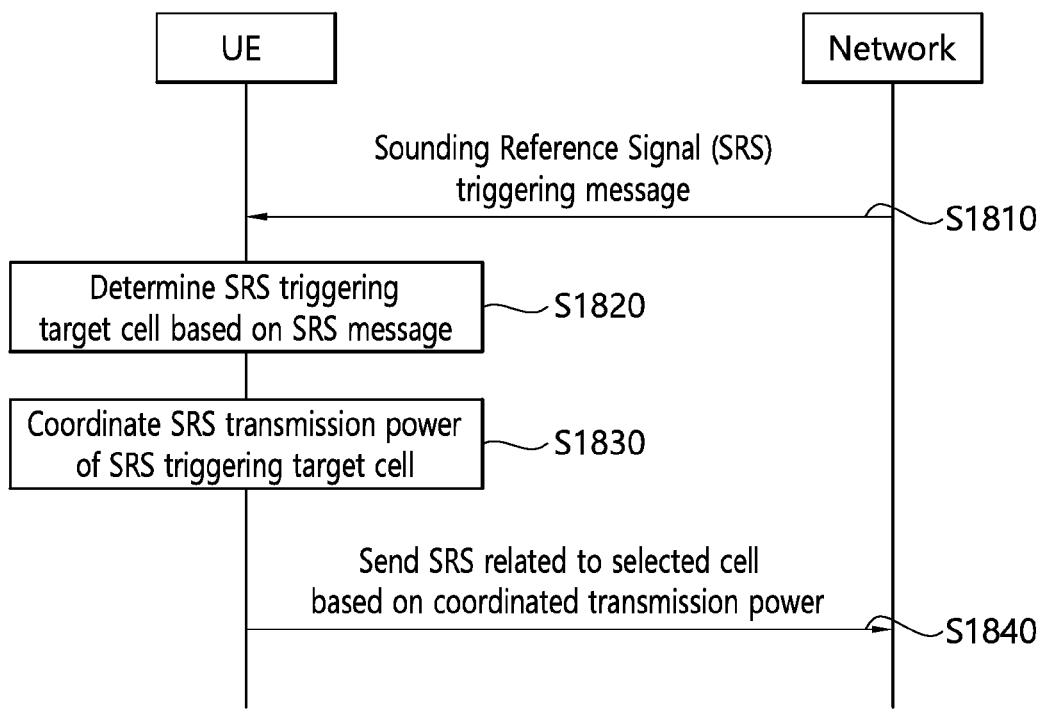
FIG. 18 is a flowchart of an SRS transmission process in a massive CA according to an embodiment of the present invention.

FIG. 18 is a flowchart of an SRS transmission process in a massive CA according to an embodiment of the present invention.

Referring to FIG. 18, a UE may receive an SRS triggering message from a network (S1810). In this case, the SRS triggering message may mean an A-SRS triggering message, and the A-SRS triggering message may be called an A-SRS_TR_MG as described above. In this case, detailed contents of the SRS triggering message received by the UE are the same as that described above.

Thereafter, the UE determines an SRS triggering target cell based on the SRS triggering message (S1820). In this case, the SRS triggering target cell means a cell whose SRS triggering message indicates SRS trigger. Detailed contents of the SRS triggering target cell are the same as that described above.

The UE may coordinate the SRS transmission power of the SRS triggering target cell (S1830). The coordination of the SRS transmission power of the SRS triggering target cell by the UE does not correspond to an essential element of the present invention. In this case, a detailed example in which the UE coordinates the SRS transmission power of the SRS triggering target cell is the same as that described above.

Thereafter, the UE sends an SRS related to the selected cell (S1840). Furthermore, if the UE has coordinated the SRS transmission power of the SRS triggering target cell, the UE may send the SRS related to the selected cell based on the transmission power. A detailed example in which the UE sends the SRS related to the selected cell is the same as that described above.

Figure 19:
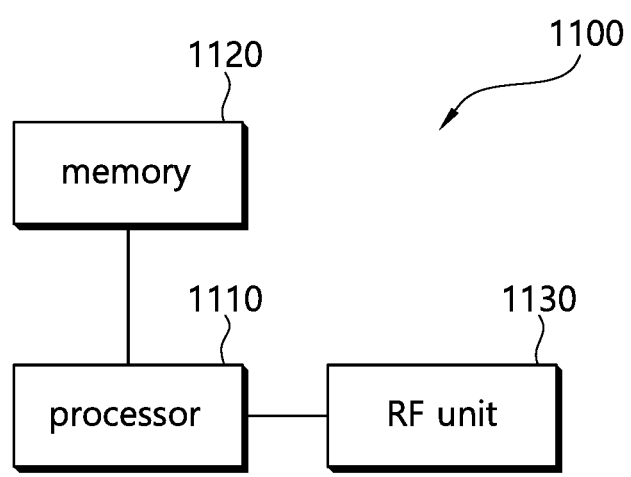
FIG. 19 is a block diagram showing a UE in which an embodiment of the present invention is implemented.

FIG. 19 is a block diagram showing a UE in which an embodiment of the present invention is implemented.

Referring to FIG. 19, the UE 1100 includes a processor 1110, memory 1120 and a radio frequency (RF) unit 1130. The processor 1110 implements the proposed functions, processes and/or methods. For example, the processor 1110 may receive an SRS triggering message from a network through the RF unit 1130. As described above, the SRS triggering message may mean an A-SRS triggering message. Detailed contents of the A-SRS triggering message are the same as that described above.

Thereafter, the processor 1110 determines an SRS triggering target cell based on the SRS triggering message through the RF unit 1130. As described above, the SRS triggering target cell means a cell whose SRS triggering message indicates SRS trigger. Detailed contents of the SRS triggering target cell are the same as that described above.

Thereafter, the processor 1110 may coordinate the SRS transmission power of the SRS triggering target cell through the RF unit 1130. As described above, the coordination of the SRS transmission power of the SRS triggering target cell does not correspond to an essential element of the present invention. A detailed example in which the SRS transmission power of the SRS triggering target cell is coordinated is the same as that described above.

Thereafter, the processor 1110 sends an SRS related to the selected cell through the RF unit 1130. As described above, if the processor has coordinated the SRS transmission power of the SRS triggering target cell, the processor may send the SRS related to the selected cell based on the transmission power. A detailed example in which the SRS related to the selected cell is transmitted is the same as that described above.

The RF unit 1130 is connected to the processor 1110 and sends and receives radio signals.

The processor may include an application-specific integrated circuit (ASIC), other chipset, a logic circuit, and/or a data processor. The memory may include read-only memory (ROM), random access memory (RAM), flash memory, a memory card, a storage medium and/or other storage devices. The RF unit may include a baseband circuit for processing a radio signal. When an embodiment is implemented in software, the aforementioned scheme may be implemented using a module (or process or function) for performing the aforementioned function. The module may be stored in the memory and executed by the processor. The memory may be placed inside or outside the processor and coupled to the processor by a variety of well-known means.

What is claimed is:
1. A method for sending at least one sounding reference signal (SRS) in a wireless communication system, the method performed by a user equipment (UE) and comprising:
   determining a transmission of the at least one SRS related to one or (N-K) cells among N cells configured in the UE by a massive carrier aggregation based on transmission power; and
   sending the at least one SRS, related to the one or (N-K) cells, to a network based on the determination,
   wherein N is a natural number having a value of 2 or more and K is a natural number having a value smaller than N,
   wherein the N cells comprise at least one cell based on a licensed spectrum and at least one cell based on an unlicensed spectrum,
   wherein, when a sum of SRS transmission power related to the N cells is greater than a predetermined value and when a sum of SRS transmission power of the at least one cell based on the licensed spectrum does not exceed the predetermined value, the UE determines the at least one cell based on the unlicensed spectrum to be K cells, and
   wherein the UE determines to drop at least one SRS transmission related to the K cells.

2. The method of claim 1,
   wherein the at least one cell based on the licensed spectrum is determined to be the one or (N-K) cells,
   wherein the UE increases transmission power of the at least one SRS related to the one or (N-K) cells at a predetermined ratio within a range in which the predetermined value is not exceeded in order to reallocate extra transmission power, and
   wherein the extra transmission power is generated based on dropping the at least one SRS transmission related to the K cells.

3. The method of claim 1, wherein
   the step of determining the transmission of the at least one SRS related to the one or (N-K) cell comprises:
   determining the at least one cell, based on the unlicensed spectrum, to be a K cell, when a sum of transmission power of the SRS related to the N cells is greater than a predetermined value and when a sum of transmission power of the SRS for the at least one cell based on the licensed spectrum does not exceed the predetermined value; and scaling down transmission power of an SRS related to the K cell at a predetermined ratio until a sum of the SRS transmission power of the SRS related to the N cell does not exceed the predetermined value, wherein the step of sending the at least one SRS to the network comprises transmitting the SRS related to the K cell is further transmitted based on the scaled-down transmission power.

\* \* \* \* \*